US005499151A

United States Patent [19]
Lee et al.

[11] Patent Number: 5,499,151
[45] Date of Patent: Mar. 12, 1996

[54] MODE CHANGING METHOD UTILIZING ONE CAM GEAR AND ONE SOLENOID FOR A CASSETTE TAPE RECORDER

[75] Inventors: Hae S. Lee; Sang D. Yu, both of Seoul, Rep. of Korea

[73] Assignee: Goldstar Co., Ltd., Seoul, Rep. of Korea

[21] Appl. No.: 350,846

[22] Filed: Dec. 7, 1994

Related U.S. Application Data

[62] Division of Ser. No. 982,541, Nov. 27, 1992, Pat. No. 5,392,182.

[30] Foreign Application Priority Data

Nov. 28, 1991 [KR] Rep. of Korea .................. 21802/1991
Dec. 6, 1991 [KR] Rep. of Korea .................. 22354/1991

[51] Int. Cl.⁶ ..................................................... G11B 5/02
[52] U.S. Cl. ............................................................ 360/137
[58] Field of Search ....................................... 360/55, 137

[56] References Cited

U.S. PATENT DOCUMENTS 5,260,844  11/1993  Koga et al. ............................. 360/137
5,392,182  2/1995  Lee et al. ................................ 360/137

*Primary Examiner*—Robert S. Tupper
*Attorney, Agent, or Firm*—Finnegan, Henderson, Farabow, Garrett & Dunner

[57] ABSTRACT

A method for mode changing of a deck mechanism suitable for use in a compact cassette tape recorder employs a single cam gear and a single electrically operated solenoid and does not cause overrunning of the tape out of the tape cassette in a mode changing operation. Mode changing is accomplished by moving a mode changing assembly along an outer cam and selectively engaging locking shoulders on the cam to change between a stop mode, play mode, reverse play mode, or reverse record mode.

3 Claims, 16 Drawing Sheets

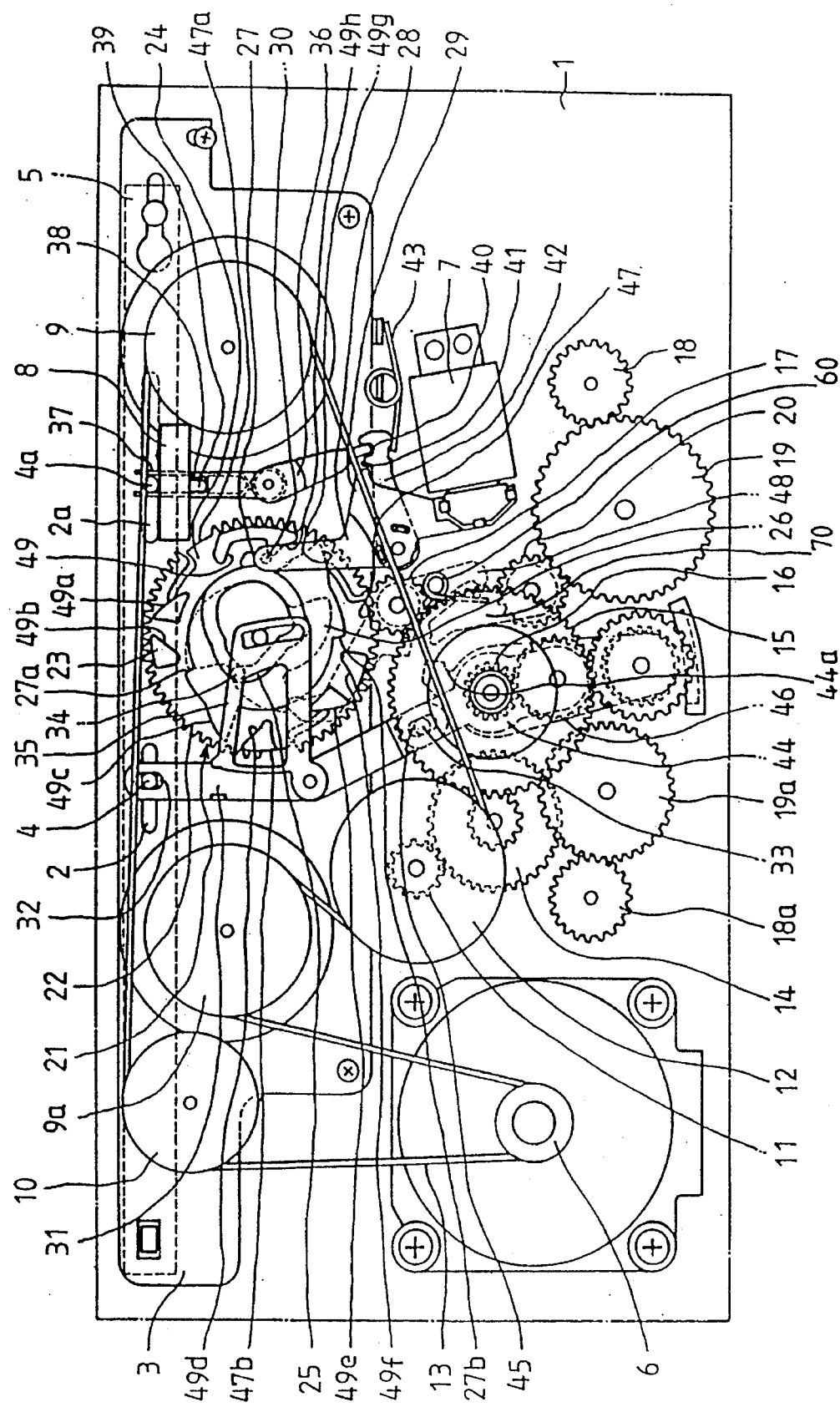

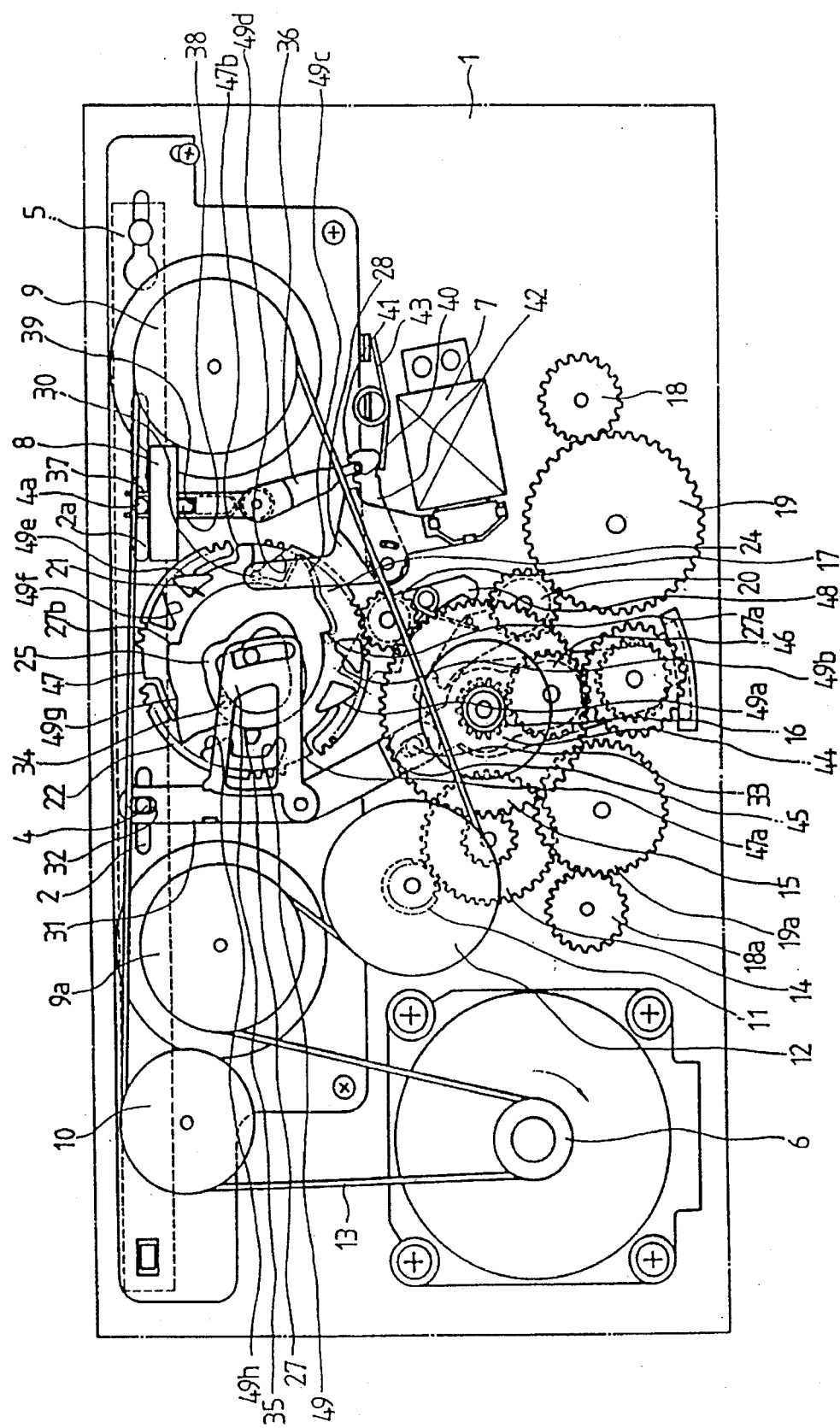

F I G.7
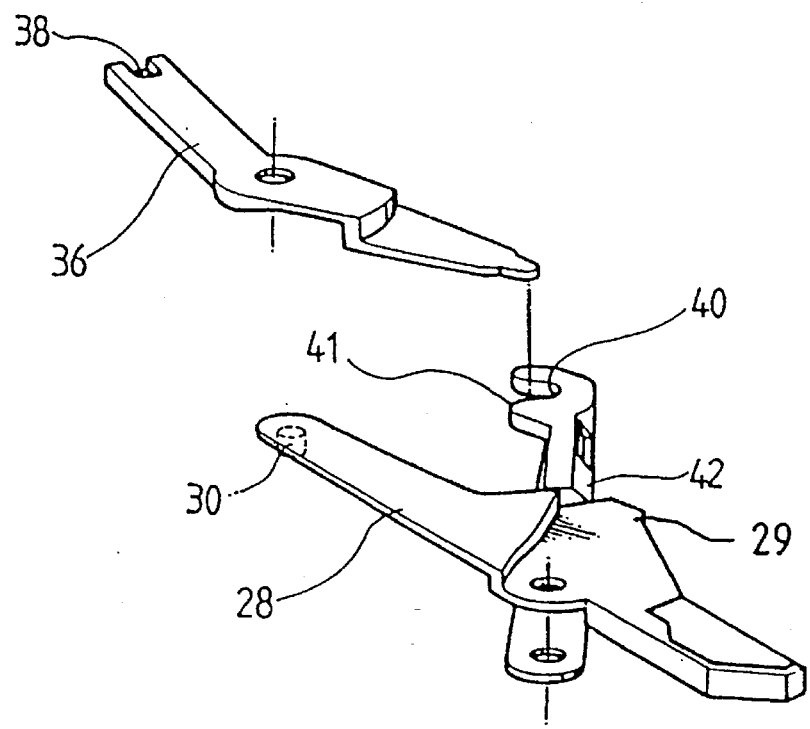
F I G.8
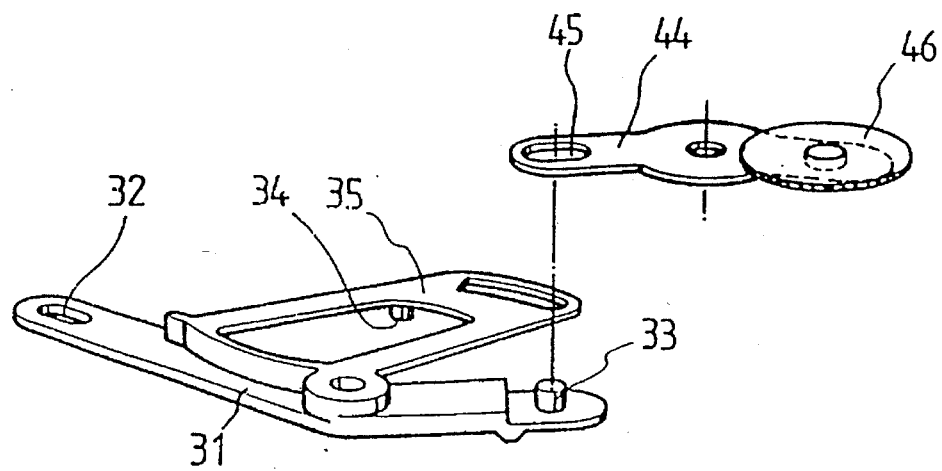

F I G.9
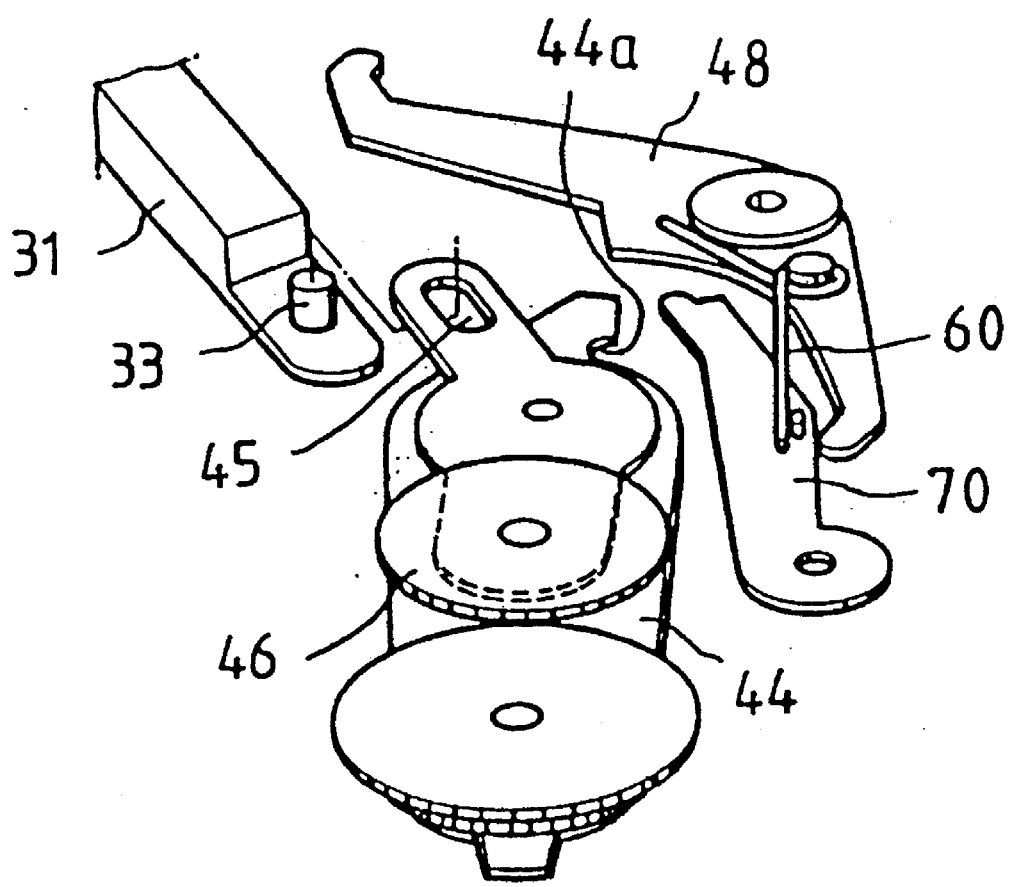

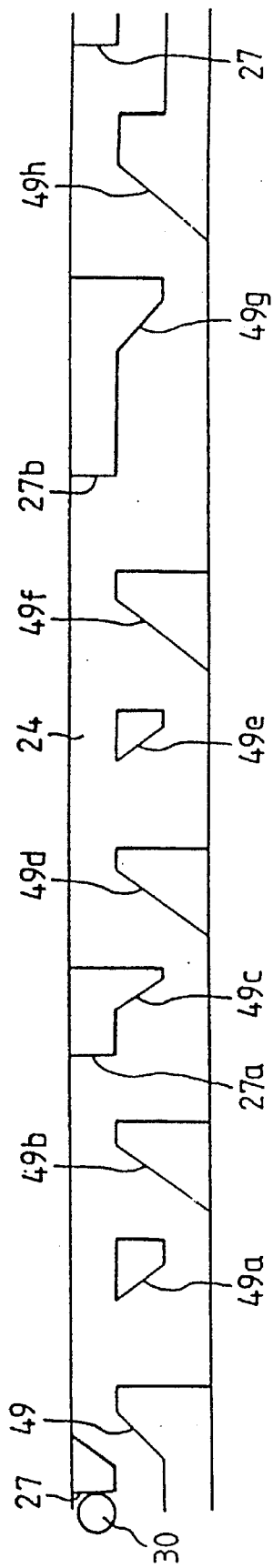
F I G. 10a
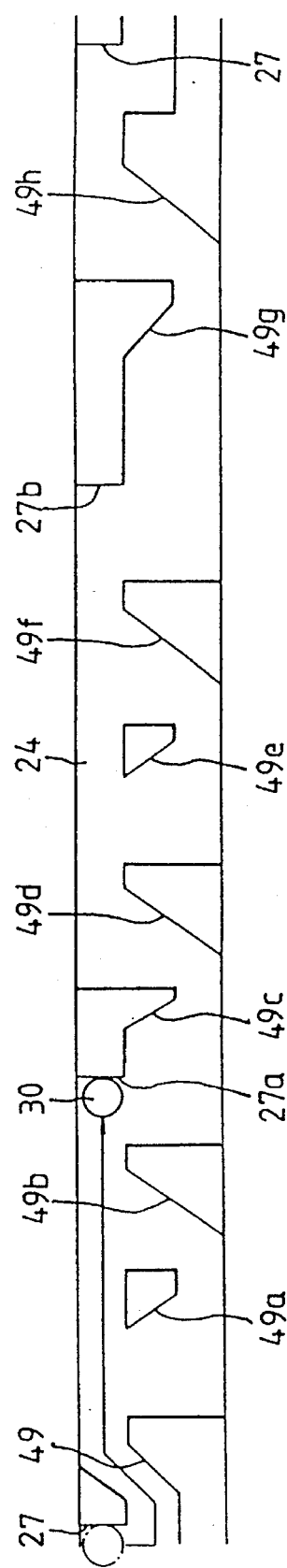
F I G. 10b

MODE CHANGING METHOD UTILIZING ONE CAM GEAR AND ONE SOLENOID FOR A CASSETTE TAPE RECORDER

BACKGROUND OF THE INVENTION

This is a division of U.S. patent application Ser. No. 07/982,541, filed Nov. 27, 1992, now U.S. Pat. No. 5,392,182.

FIELD OF THE INVENTION

The present invention relates in general to an improvement of deck mechanisms of cassette tape recorders, and more particularly, to a mode changing apparatus of a deck mechanism suitable for use in a compact cassette tape recorder which has a simple construction including only one cam gear and one electrically operated solenoid for permitting the mode changing operation of the cassette tape recorder to be accurately carried out and does not cause overrunning of the tape out of the tape cassette during mode changing operations of the tape recorder. The present invention also relates to a method for mode change using such an apparatus.

DESCRIPTION OF THE RELATED ART

Conventionally, cassette tape recorders ("tape recorders") are electronic devices for playing back audio and video signals recorded on the tape, preferably magnetic tape, of the tape cassette or recording outside sound and image on the magnetic tape. Conventional tape recorders are generally constructed so as to easily change between modes, such as a stop mode, a play mode, a record mode, a reverse play mode and a reverse record mode. In this respect, it is required to provide mode changing apparatus for the cassette deck, or the deck mechanism of the tape recorder. Otherwise stated, the mode changing apparatus is equipped to the tape recorders in order to selectively play back audio and video signals recorded on A or B recording surface of the tape or record outside sound and image on the A or B recording surface as demanded.

In the known mode changing apparatus, a cam gear, rotating upon reception of driving power from a drive motor, carries out a required mode changing operation in cooperation with a solenoid electrically operated upon reception of electric power from an outside power source. As is well known in the art, the known mode changing apparatus requires a pair of cam gears and a pair of solenoids in order to carry out the mode changing operation. One of the cam gears is adapted for mode changing, but the other is adapted for a switching operation. Also, each of the pair of solenoids is adapted for controlling the operation of each cam gear.

In this respect, the known mode changing apparatus of the tape recorders necessarily has a double structure as a result of a pair of power transmission members for driving, using the driving power of the drive motor, the cam gears and the solenoids and a pair of mode changing members, thereby causing the number of required parts to be increased and its construction to be complex. As a result, the manufacturing cost of the deck mechanism is increased and a recent trend for compactness and thinness of the tape recorders can not be effectively accomplished.

A representative deck mechanism having the above described mode changing apparatus is depicted in FIGS. 1a and 1b. In the mechanism of FIGS. 1a and 1b, the mode changing apparatus includes a main gear 142 and a power transmission gear 143 which are hinged to or rotatably mounted on a main plate 141 and rotate upon reception of drive power outputted from a drive motor (not shown). Here, the driving power of the drive motor is applied to the gears 142 and 143 by way of intermediate means and power transmission means, respectively. In addition, a cam gear 144 is rotatably mounted on the main plate 141 and selectively rotates when it is applied with the driving power of the drive motor through the power transmission gear 143, while a solenoid lever 146 is movably mounted on the main plate 141 in order to rotate in response to the operation of a solenoid 145 and, as a result, cause the cam gear 144 to initially engage with the power transmission gear 143. Under the cam gear 144, an upward and downward moving plate 147 is movably mounted on the main plate 141. This moving plate 147 moves upwards and downwards in accordance with the rotation of the cam gear 144. This moving plate 147 is also restricted in its upward and downward movement within a predetermined restriction range under the control of a movable restriction lever 148 which is also rotatably mounted on the main plate 141 and rotates about its hinged shaft according to the rotation of the cam gear 144. The mode changing apparatus further comprises a plate head lever 149 and a leftward and rightward moving plate 150, the former being elastically mounted on the main plate 141 in order to move along with the upward and downward movement of the moving plate 147 while the latter being mounted on the main plate 141 and moving leftwards and rightwards when the restriction lever 148 rotates. A selection lever 152 is hinged to the main plate 141 and provided at its one end with a movable gear 151 which in turn engages with the main gear 142.

The cam gear 144 is provided with a rack 153, an inner cam 154 and an outer cam 155 which are integrally formed with the gear 144. The rack 153 is formed on the circumferential periphery of the gear 144 with provision of predetermined intervals, the inner cam 154 is formed on the lower surface of the gear 144 in order to permit the upward and downward moving plate 147 to selectively move when the cam gear 144 rotates. The outer cam 155 is formed on the lower surface of the gear 144 in order to make the solenoid lever 146 return to its initial position when the cam gear 144 rotates.

Meanwhile, the upward and downward moving plate 147 is integrally provided at its upper part with a stop bolt 156. In addition, first and second stationary plates 157 and 158 are fixed to a lower part of the moving plate 147 while a longitudinal hole 159 is formed on a middle part of this plate 147. This longitudinal hole 159 movably receives the rotating shaft of the cam gear 144 and, in this respect, upwardly and downwardly guided by the rotating shaft of the gear 144.

The restriction lever 148 is provided with a depression part 160 and a locking shoulder 161. As a result, when the upward and downward moving plate 147 moves in an upward or downward direction, the second stationary plate 158 of this plate 147 is selectively guided by the depression part 160 or engages with the locking shoulder 161 of the restriction lever 148.

The plate head lever 149 has a hole 162 at a side thereof in order to receive the stop bolt 156 of the upward and downward moving plate 147. Also, at a lower part of plate head lever 147, a spring 163 is provided so as to bias the plate head lever 147 in a given direction.

As depicted in these drawings, an end of the leftward and rightward moving plate 150 is connected to an end of the restriction lever 148 and causes the moving plate 150 to move leftwards or rightwards when the restriction lever 148 rotates and, as a result, a depression part 164 on the other end of the moving plate 150 comes into contact with one end of the selection lever 152 or is separated from the one end of the selection lever 152.

In operation of the deck mechanism having the aforementioned construction, upon selection of a play mode at the state shown in FIG. 1a showing a stop mode of the conventional deck mechanism, the drive motor is applied with outside electric power and rotates. The rotational power, or the driving power, of the drive motor is in turn transmitted to the main gear 142 and the power transmission gear 143, both being rotatably mounted on the main plate 141, by way of the power intermediate means and the power transmission means.

At the same time, the electrically operated solenoid 145 is also applied with the outside electric power, causing the solenoid 145 to push the other end of the solenoid lever 146. As a result, the solenoid lever 146 turns clockwise about its hinged shaft and causes its one end, engaging with the outer cam 155 of the cam gear 144, to slightly push the outer cam 155 so as to make this gear 155 rotate clockwise. At this time, since the rack 153 on the outer periphery of the cam gear 144 engages the power transmission gear 143, the rotation of the power transmission gear 143 causes the cam gear 144 to rotate clockwise.

The inner cam 154 on the lower surface of the cam gear 144 pushes the first stationary plate 157 fixed to the upward and downward moving plate 147 and, in this respect, the moving plate 147 moves downwardly under the condition that its longitudinal hole 159 is guided by the hinged shaft of the cam gear 144. Also, since the stop bolt 156 integrally formed with the moving plate 147 is inserted in the hole 162 of the plate head lever 149, this plate head lever 149 moves downwardly as it is biased by the spring 163 when the moving plate 147 moves downwards.

On the other hand, when the upward and downward moving lever 147 moves downwards as described above, the second stationary plate 158 fixed to the lower part of the moving lever 147 escapes from the depression part 160 of the restriction lever 148 in order to be in turn guided by the inclined surface of the restriction lever 147. Therefore, the second stationary plate 158 is caught by the locking shoulder 161. At this time, the leftward and rightward moving plate 150, connected at its end to the one end of the restriction lever 148, moves leftwards due to the downward movement of the moving lever 147.

The depression part 164 formed on the other end of the moving plate 150 then comes into contact with the one end of the selection lever 152 and, as a result, permits the selection lever 152, which is moved by the rotational power of the movable gear 151 rotating along with the rotation of the main gear 142 with which it engages, to stop its turning operation. Thus, when the play mode is selected, interference of an upper movable gear 167 with first and second driven gears 165 and 166 is prevented because of the connection of the moving plate 150 and the selection lever 152.

FIG. 1b shows the deck mechanism after the mode changing operation from the stop mode to the play mode is accomplished. As depicted in this drawing, the solenoid lever 146 returns to its initial position by the rotational power of the outer cam 155 of the cam gear 144 which continuously rotates at this time. The upward and downward moving lever 147 does not return to its initial position, or the upper position, but maintains its lower position, or the downward moved position, because of its locking state wherein it is caught by the locking shoulder 161 of the restriction lever 148.

Also, since the plate head lever 149 maintains its lower position, it drives a head (not shown). At this state, the rotational power of the main gear 142 is transmitted to a reel (not shown) of the tape cassette, loaded on the deck mechanism, by way of a power transmission member (not shown). Thus, the audio signals recorded on the tape out of the tape cassette are permitted to be played back.

On the other hand, when the stop mode is selected at the state of the aforementioned play mode, the aforementioned mode changing operation of the deck mechanism is reversely carried out. To this case, the leftward and rightward moving plate 150 which has supported the turning operation of the selection lever 152 fully returns to its initial position.

Thus, even when the stop mode is selected, the main gear 142 continues its rotation for a moment because of the intrinsic overrunning of the drive motor. This overrunning of the motor occurs since the motor can not stop just after selection of the stop mode but continues its rotation in a predetermined number of revolutions. The lower movable gear 151 engaging the main gear 142 thus rotates, causing the selection lever 152 to be biased toward the rotational direction of the lower movable gear 151.

In this respect, the upper movable gear 167 rotating together with the lower movable gear 151 causes both the first and second driven gears 165 and 166 to rotate in accordance with the mode changing operation for the play mode or the reverse play mode and, as a result, makes the reel of the tape rotate. Hence, the known mode changing apparatus of the tape recorder causes the tape out of the tape cassette to overrun as much as the predetermined number of revolutions of the reel after the stop mode is selected, thereby having a problem in that when the tape recorder starts its play mode or its reverse play mode, the audio and video signals recorded on a part of the tape which overran due to the revolutions of the reel after the stop mode is selected can not be played back.

SUMMARY OF THE INVENTION

It is, therefore, an object of the present invention to provide a mode changing apparatus of a deck mechanism of a cassette tape recorder in which the aforementioned problems can be overcome and which efficiently carries out a required mode changing operation using only one cam gear and one solenoid and, in this respect, reduces the number of required parts and manufacturing cost and accomplishes the recent trend of compactness and thinness of the tape recorders.

It is another object of the present invention to provide a mode changing apparatus of a deck mechanism of a cassette tape recorder in which even when there occurs conventional overrunning of a drive motor causing a cam gear to idle rotate in a predetermined number of rotations in a stop mode selection as well as play mode, record mode, reverse play mode and reverse record mode selections, the tape of the tape cassette does not overrun.

It is still another object of the present invention to provide a method for mode changing of a cassette tape recorder using such a mode changing apparatus.

The present invention provides mode changing apparatus of a deck mechanism of a cassette tape recorder comprising: a main plate; a drive motor for generating driving power, said motor being mounted on said main plate; a stationary plate mounted on said main plate with a space therebetween, said stationary plate having a pair of longitudinal holes; a movable plate which is movably arranged in the space between said main and stationary plates, said movable plate having a pair of pins each of which is movably inserted in each of said longitudinal holes of the stationary plate in such a manner that it permits said movable plate to move in the space between said main and stationary plates; intermediate means for intermediating the driving power of said drive motor within an intermediating section, said means being mounted on both the main and stationary plates; power transmission means for transmitting the driving power of said drive motor which has been intermediated by said intermediate means to a cam assembly; said cam assembly for selectively rotating upon reception of the driving power of the drive motor which is transmitted thereto by said power transmission means; mode changing means for changing a mode of said deck mechanism into another mode in response to operation of a solenoid, said means being mounted on said main plate; movable means for causing the movable plate to move leftwards or rightwards in accordance with rotation of said cam assembly, said means being mounted on said main plate; actuating means for selectively actuating a mode switch, said switch being adapted to switch the mode of said tape recorder, in accordance with movement of said movable plate, said means being elastically mounted on said stationary plate; first restriction means for restricting rotation of said actuating means in accordance with rotation of said mode changing means, said first restriction means being elastically mounted on said main plate; selection means for selectively transmitting the drive power of said motor in order to carry out a play mode, a record mode, a reverse play mode and a reverse record mode of said deck mechanism in accordance with rotation of said movable means, said means being mounted on said main plate; biasing means for causing said cam assembly to initially engage with said power transmission means, said means being mounted on said main plate so as to turn by means of its own elasticity; and second restriction means for restricting rotation of said selection means, said means being mounted on said main plate so as to turn when the biasing means rotates.

In another aspect, this invention provides a method for mode changing of a deck mechanism of a cassette tape recorder comprising: causing said mode changing means to move along said outer cam in different moving passages in order to be caught by one of said locking shoulders, thereby achieving said mode change for a stop mode, a play mode, a reverse play mode or a reverse record mode of said deck mechanism.

BRIEF DESCRIPTION OF THE DRAWINGS

The above and other objects, features and other advantages of the present invention will be more clearly understood from the following detailed description taken in conjunction with the accompanying drawings, in which:

FIGS. 1a and 1b show a construction of a deck mechanism combined with a conventional mode changing apparatus, respectively, in which:

FIG. 1a is a partial plane view showing the deck mechanism in a stop mode; and

FIG. 1b is a partial plane view showing the deck mechanism in play mode;

FIG. 2 is a plane view showing a construction of a deck mechanism, in a stop mode, combined with mode changing apparatus in accordance with a preferred embodiment of this invention;

FIGS. 4a and 4b are views corresponding to FIG. 2, but showing a record mode changing operation, respectively, in which:

FIG. 4a shows a state wherein the mode changing operation is carried out; and

FIG. 4b shows a state wherein the mode changing operation is completed;

FIGS. 5a to 5c are views corresponding to FIG. 2, but showing a mode changing operation for a reverse play mode, respectively;

FIG. 7 is an enlarged exploded perspective view showing interconnection between a mode changing lever, an actuating lever and a restriction lever of the deck mechanism of FIG. 2;

FIG. 8 is an enlarged exploded perspective view showing interconnection between a movable lever and a selection lever of the deck mechanism of FIG. 2;

FIG. 9 is an enlarged exploded perspective view showing interconnection between a tape overrunning restriction lever, or a second restriction lever, and the selection lever of the deck mechanism of FIG. 2; and FIGS. 10a to 10f are schematic views showing positions and running passages of a protuberance of the mode changing lever with respect to an outer cam of a cam gear of the deck mechanism of this invention during respective mode changing operations, in which:

FIG. 10a shows a stop mode;

FIG. 10b shows a mode changing operation from the stop mode to a play mode;

FIG. 10c shows a mode changing operation for a record mode

FIG. 10d shows a mode changing operation for a reverse play mode;

FIG. 10e shows a mode changing operation for a reverse record mode; and

FIG. 10f shows a mode changing operation for changing the play, record, reverse play or reverse record to the stop mode.

DETAILED DESCRIPTION OF THE PREFERRED EMBODIMENTS

Figure 1A:
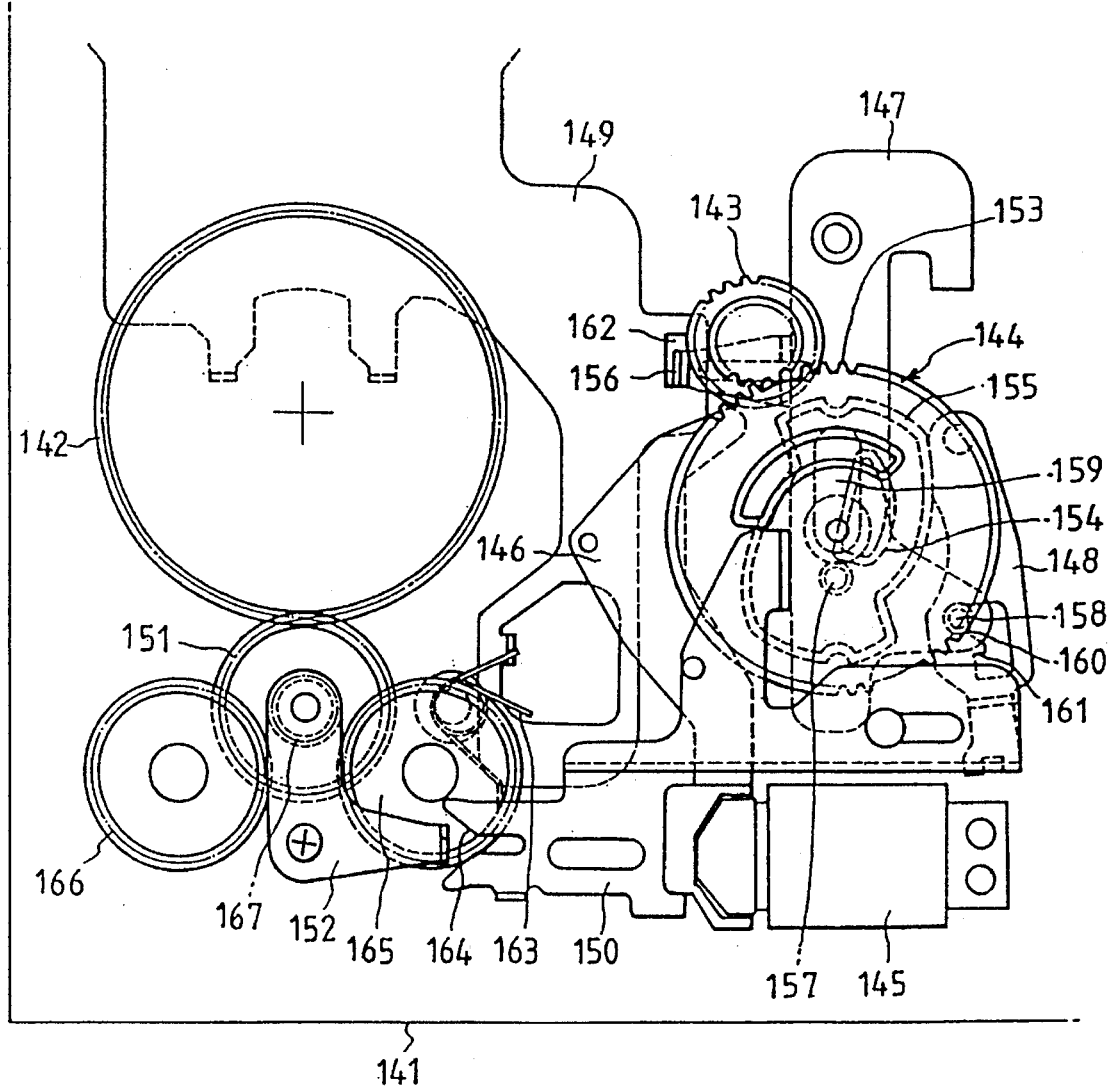
Figure 1B:
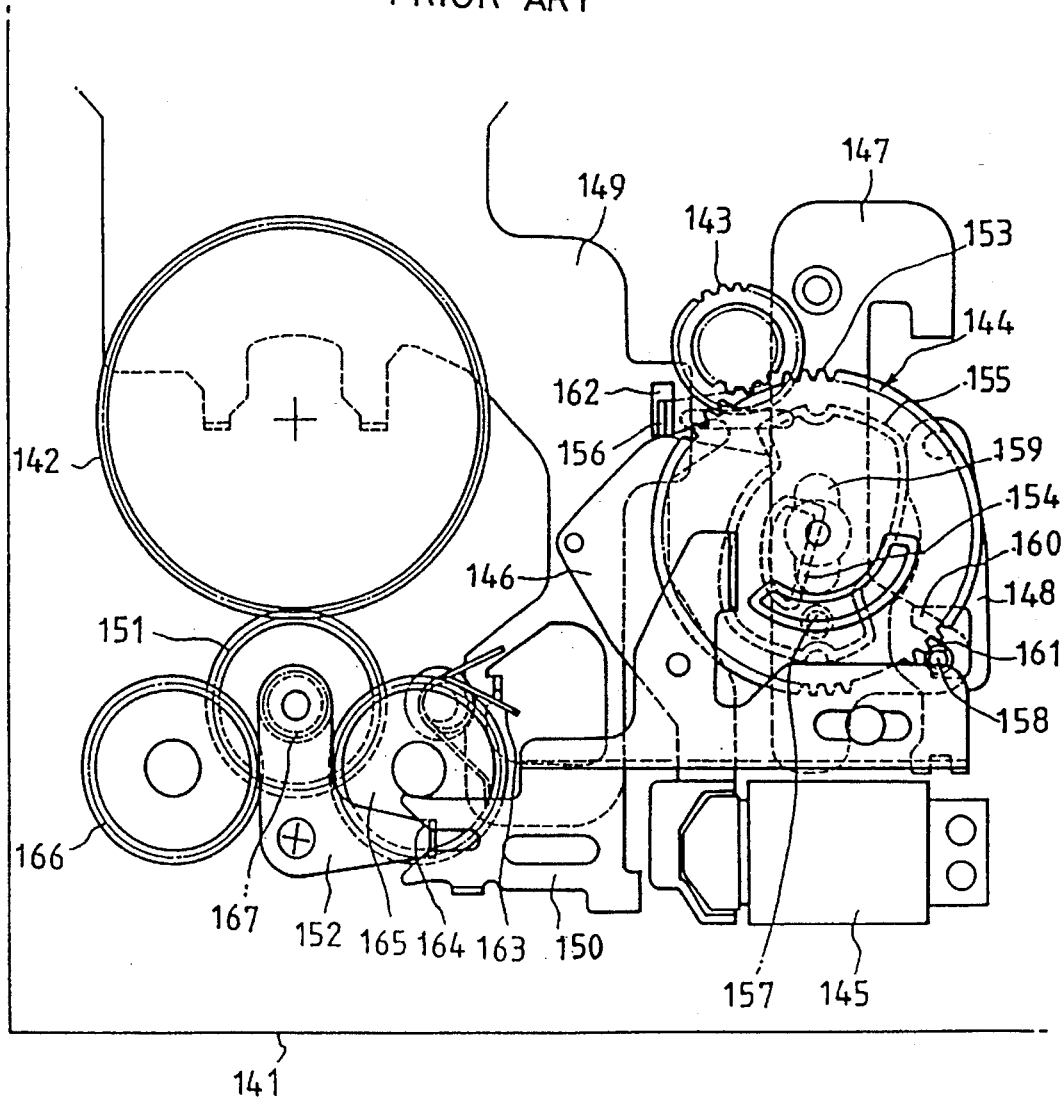
Figure 3:
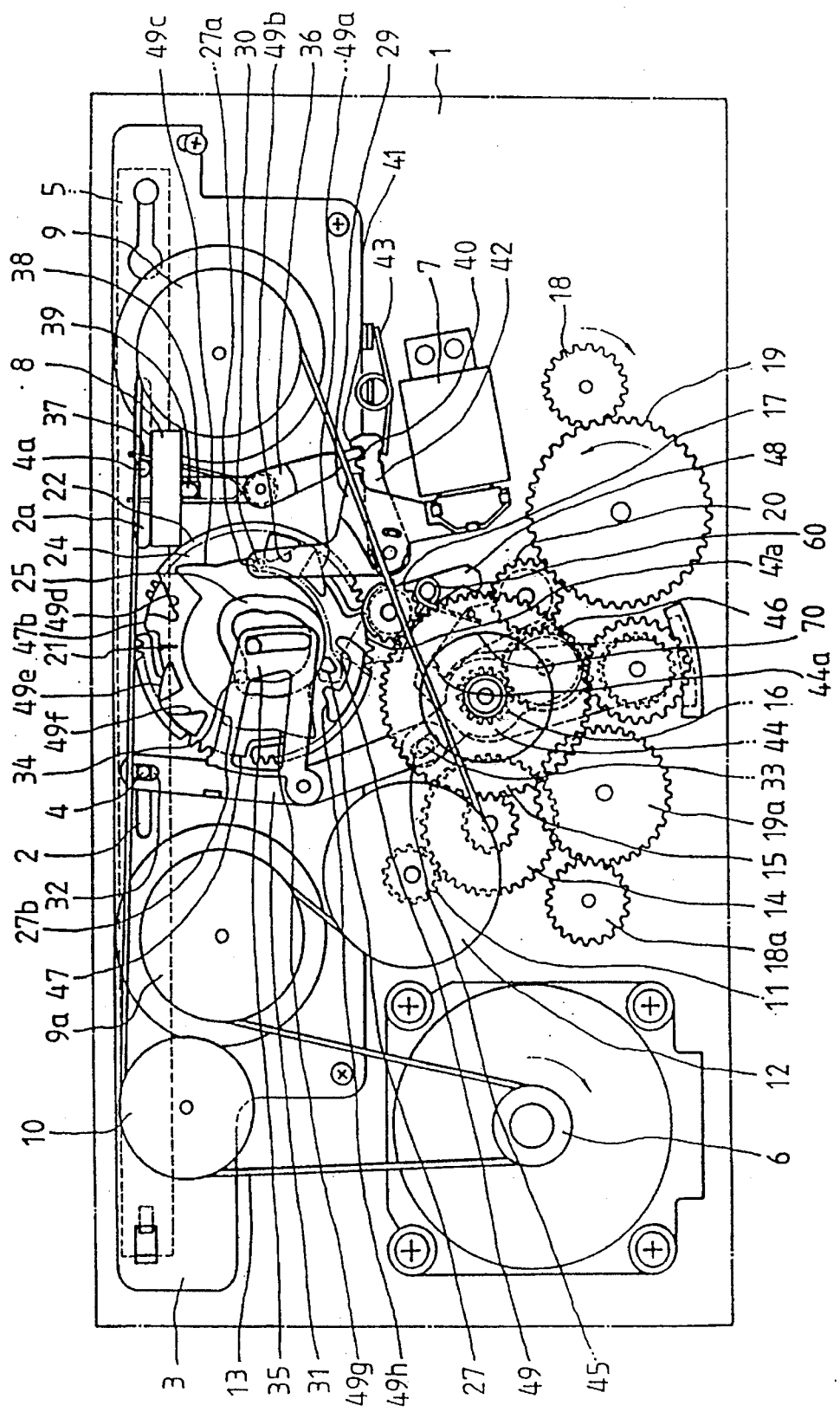
FIG. 3 is a view corresponding to FIG. 2, but showing a play mode.
Figure 4A:
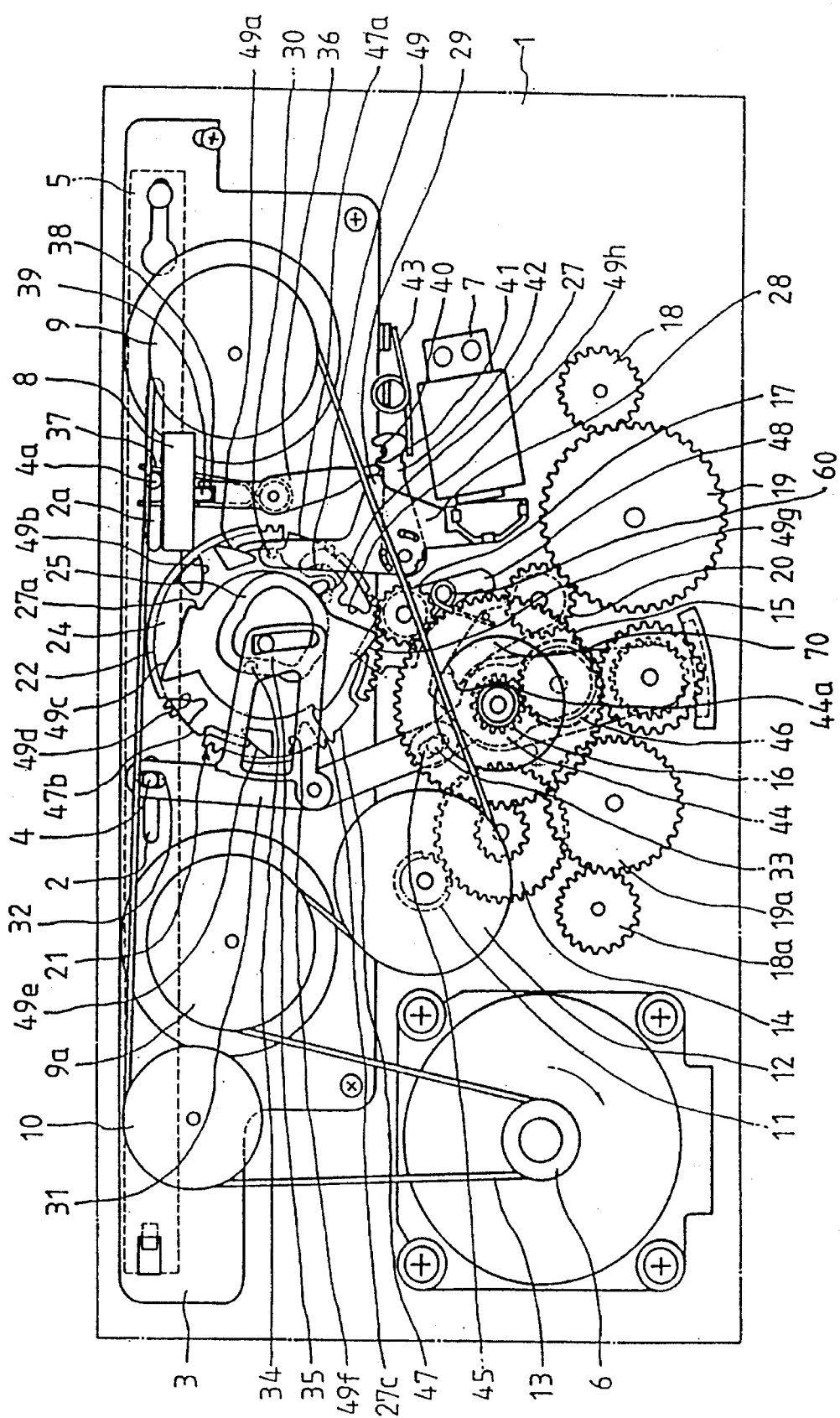
Figure 4B:
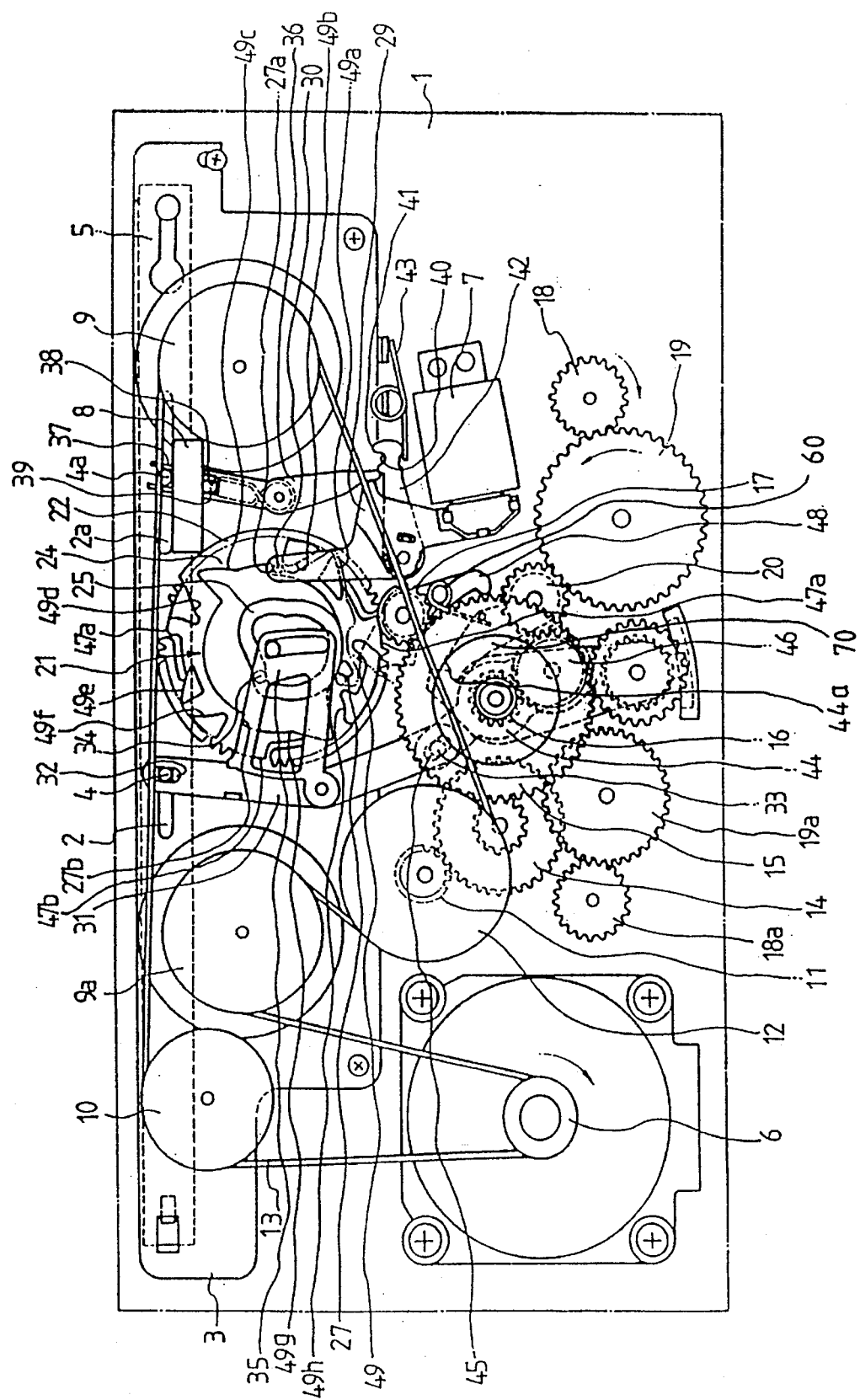
Figure 5A:
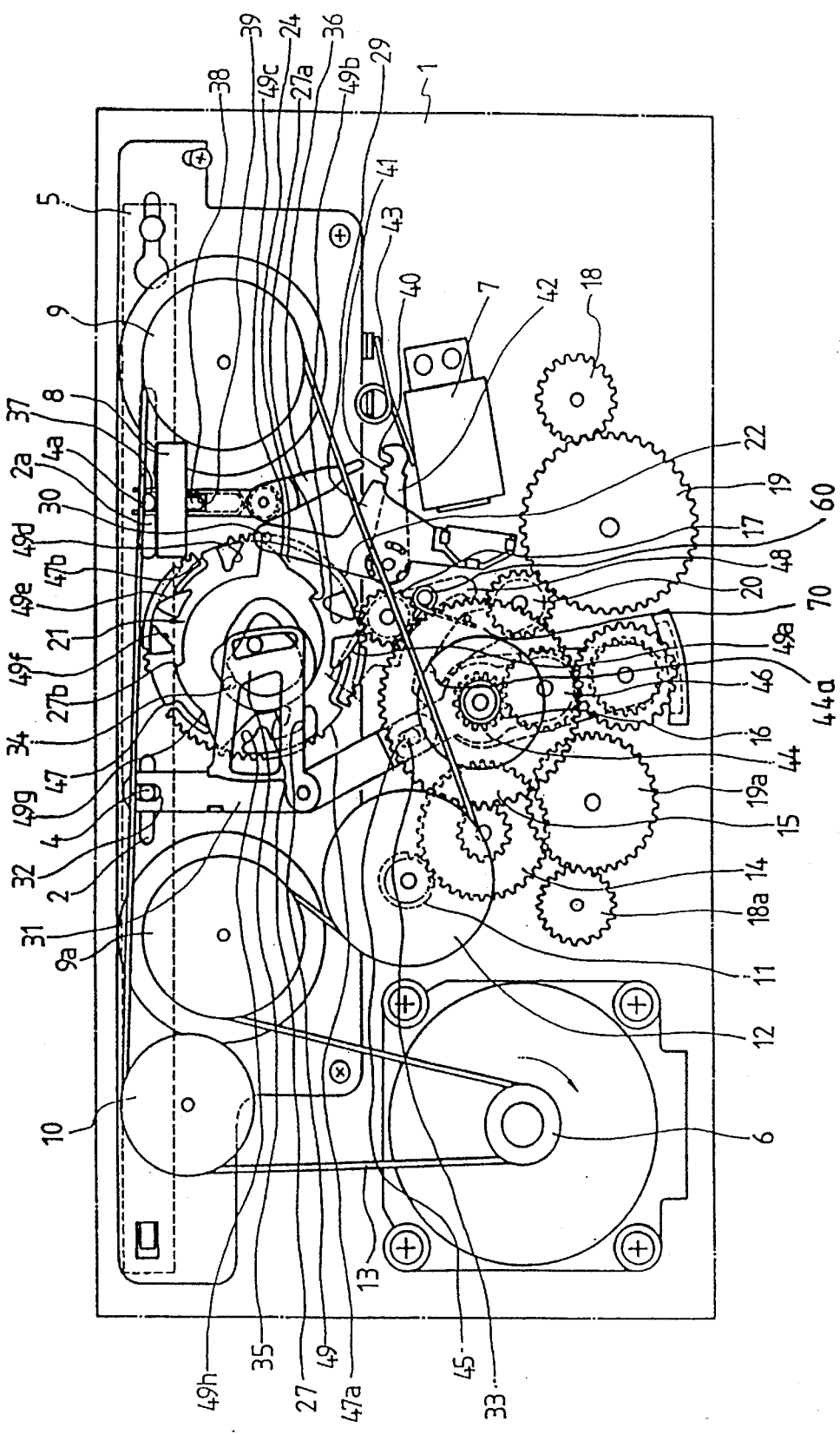
Figure 5C:
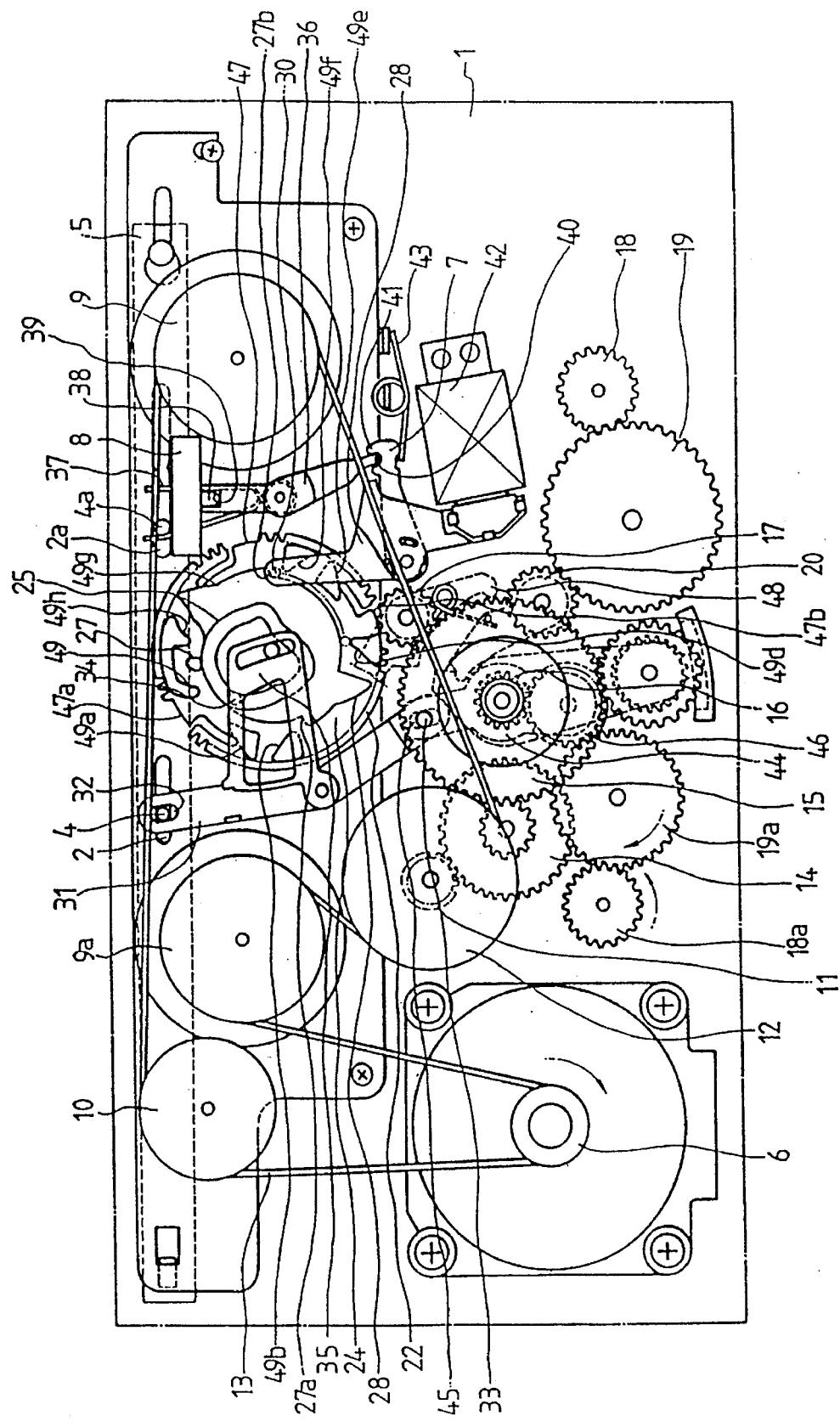
Figure 6A:
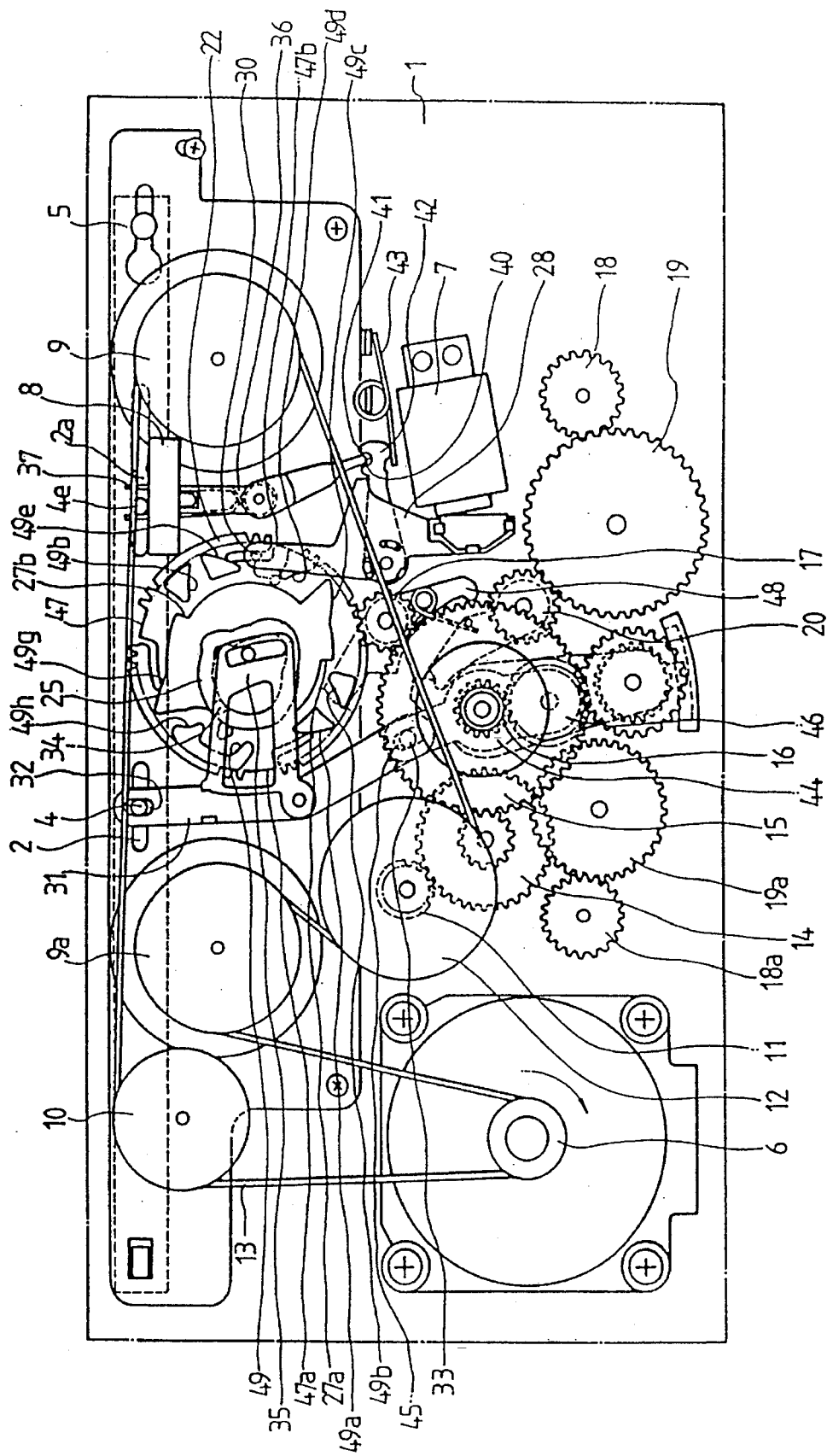
FIGS. 6a and 6b are views corresponding to FIG. 2, but showing a mode changing operation for a reverse record mode, respectively.
Figure 6B:
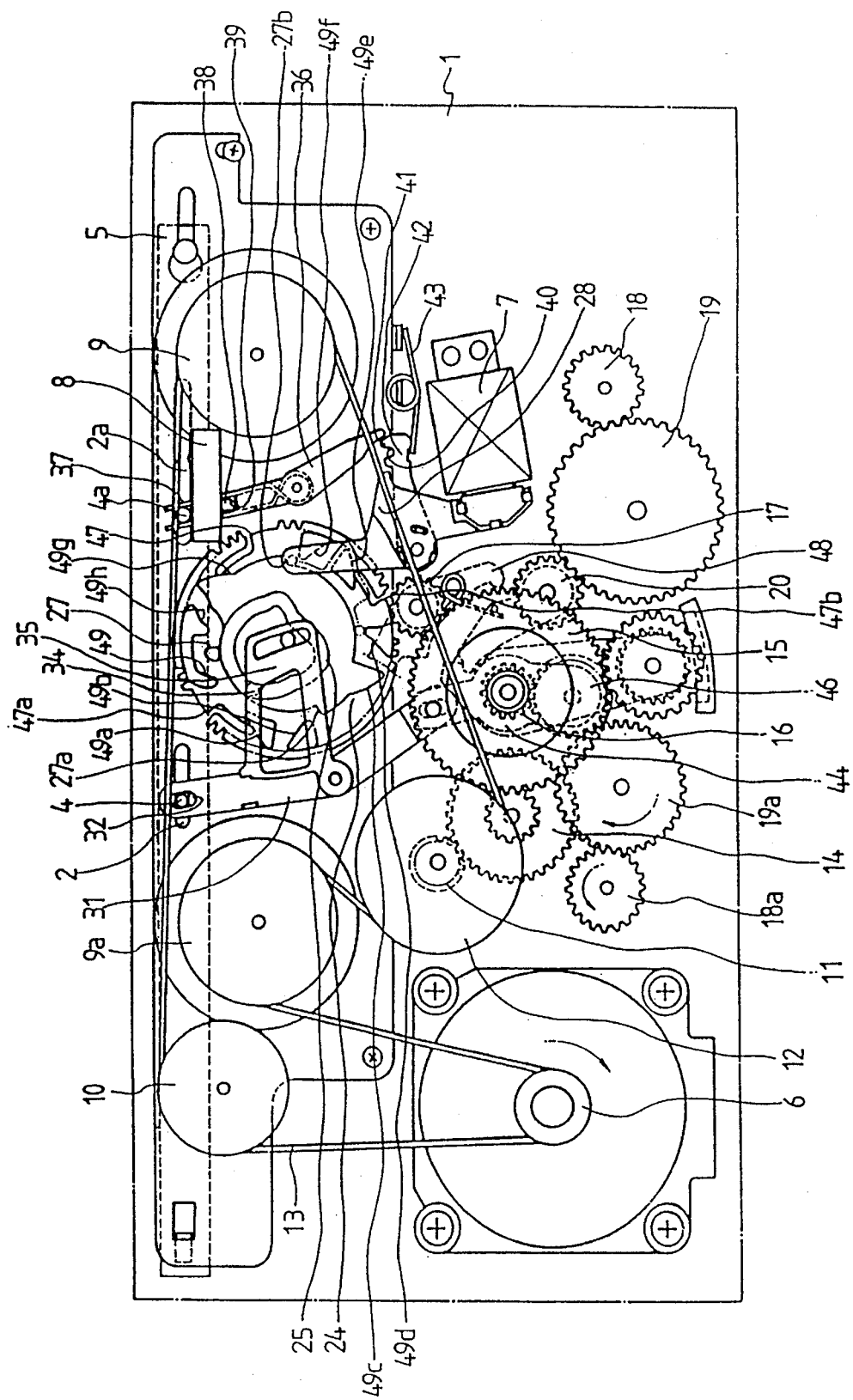

FIG. 2 shows a deck mechanism combined with a mode changing apparatus of the preferred embodiment of the present invention in a stop mode, FIG. 3 shows a play mode, FIGS. 4a and 4b show a mode changing operation for a record mode, FIGS. 5a to 5c show a mode changing operation for a reverse play mode and FIGS. 6a and 6b show a mode changing operation for a reverse record mode. As shown in these drawings, the deck mechanism includes a main plate 1 on which a plurality of parts are fixedly or movably mounted. On the main plate 1, a stationary plate 3 having a pair of longitudinal holes 2 and 2a is mounted in such a manner that it is spaced apart from and parallel to the main plate 1 by a predetermined space.

A movable plate 5 is additionally arranged between an upper surface of the main plate 1 and a lower surface of the stationary plate 3 and easily moves in the space provided by the two plates 1 and 3. This movable plate 5 is integrally provided with a pair of slide pins 4 and 4a which are movably inserted into the longitudinal holes 2 and 2a of the stationary plate 3 so as to protrude out of the holes 2 and 2a, respectively. On the main plate 1 and the stationary plate 3, an intermediate assembly is rotatably mounted in order to intermediate driving power outputted from a drive motor 6 in a predetermined drive power intermediating range. In order to transmit this driving power of the drive motor 6 which has been intermediated by the intermediate assembly to a cam assembly, the present deck mechanism is also includes a power transmission assembly. Here, the cam assembly is rotatably mounted on the stationary plate 3 and selectively rotates upon reception of the driving power of the drive motor 6 which is transmitted thereto by the above power transmission assembly. In addition, a mode changing assembly and a movable assembly are rotatably mounted on the main plate 1. The mode changing assembly changes a mode of the deck mechanism to another mode in response to operation of a solenoid 7. The movable assembly permits the movable plate 5 to move leftwards or rightwards in response to the rotational direction of the cam assembly. An actuating assembly is elastically mounted on the stationary plate 3 and selectively rotates in response to movement of the movable plate 5 so as to actuate a switch 8 for switching the mode of the tape recorder, while a first restriction mechanism is elastically mounted on the main plate 3 and rotates together with rotation of the mode changing assembly in order to restrict the rotation of the actuating assembly within a predetermined rotational angle.

The preferred deck mechanism further includes a selection mechanism to selectively transmit the drive power of the drive motor 6 in the play mode, the record mode, the reverse play mode or the reverse record mode to the driven parts. The selection mechanism is hinged to the main plate 1 so as to turn when the movable assembly rotates. The turning of the selection mechanism causes the above selective power transmission operation to be carried out. A biasing mechanism is hinged to the main plate 1 and turns about its turning shaft by means of its own elasticity. Hence, this biasing means permits a cam gear 21 of the cam assembly to initially engage with the power transmission assembly. Moreover, This deck mechanism is provided with a second restriction mechanism that is hinged to the main plate 1 and turns about its hinged shaft when the biasing mechanism rotates, thereby restricting the rotation of the selection mechanism within a predetermined range. This second restriction mechanism is particularly provided for the deck mechanism in order to prevent the overrunning of the tape out of the tape cassette and its operation for preventing the overrunning of the tape will be separately described in detail.

Hereinafter, the aforementioned assemblies and mechanisms will be described in detail.

First, the intermediate assembly comprises, as depicted in FIG. 2, a pair of capstans 9 and 9a and an auxiliary pulley 10, which are rotatably mounted on the stationary plate 3, and a main pulley 12 having a main gear 11 which is rotatably mounted on the main plate 1. This main gear 11 is concentrically arranged with the main pulley 12 in such a manner that it rotates together with the rotation of the main pulley 12. Here, the capstans 9 and 9a, the auxiliary pulley 10 and the main pulley 12 are connected to and cooperate with each other by means of a drive belt 13. This belt 13 is also connected to the drive motor 6 in such a manner that this belt 13 wraps about the drive and driven members 6, 9, 9a, 10 and 12 and, in this respect, the driven members 9, 9a, 10 and 12 are driven by the drive power of the drive motor 6.

The power transmission assembly comprises a first power transmission gear 14 which engages with the main gear 11 of the main pulley 12 so as to rotate when the main gear 11 rotates upon reception of the driving power of the drive motor 6 which is transmitted thereto by means of the belt 13. This first transmission gear 14 in turn engages with an upper driven gear 15 so that the rotation of the first transmission gear 14 causes a lower driven gear 16 which is combined with the upper driven gear 15 to rotate. The power transmission assembly further comprises a second power transmission gear 17 and first and second reel gears 18 and 18a. Here, the second power transmission gear 17 engages with the upper driven gear 15 and rotates in response to the rotation of the gear 15, while the first and second reel gears 18 and 18a are rotatably mounted on the main plate 1 such that they are disposed on both sides of the upper driven gear 15 with intervals therebetween, respectively. These first and second reel gears 18 and 18a intend to drive the reels of the tape cassette and engage with first and second intermediate gears 19 and 19a, respectively. In addition, a third power transmission gear 20 is rotatably mounted on the main plate 1 so as to engage with the first intermediate gear 19. Similar to the third transmission gear 20, the others of the abovementioned gears of the power transmission assembly are hinged to the main plate 1 so as to rotate about their hinged shafts.

The cam assembly comprises the cam gear 21 having three racks 22 on the circumferential periphery thereof with three intervals 47, 47a and 47b which are provided between racks 22. This cam gear 21 is also provided with an outer cam 24 and an inner cam 25 formed on its upper surface, the former comprising a plurality of protuberances 23 having different shapes and the latter comprising a non-circular groove formed inside of the former. A lower cam 26 is provided on the lower surface of the cam gear 21.

The outer cam 24 has three locking shoulders 27, 27a and 27b to one of which the mode changing assembly is caught in accordance with the rotation of the cam gear 21 and, as a result, the deck mechanism accomplishes a mode changing operation for a required mode, such as the stop mode, the play mode, the record mode, the reverse play mode or the reverse record mode.

The mode changing assembly comprises a mode changing lever 28 for changing the mode of the deck mechanism in accordance with the operation of the electrically operated solenoid 7. This mode changing lever 28 has an integrally formed pushing part 29 for controlling a turning operation of the first restriction mechanism and is provided at its lower end with a slide protuberance 30 which is in turn movably inserted in the outer cam 24 of the cam assembly and guided thereby.

In order to constitute the movable assembly, the deck mechanism is provided with a movable lever 31 having a longitudinal hole 32 at its one end and an upward protuberance 33 at its other end. This longitudinal hole 32 movably receives the one slide pin 4 of the movable plate 5. The movable lever 31 further includes an integrally formed extension rib 35 which has a downward protuberance 34. This protuberance 34 is in turn inserted in the inner cam 25 of the cam gear 21 and guided thereby.

The actuating assembly, which tends to selectively turn about its turning shaft in response to movement of the movable plate 5, comprises an actuating lever 36 which is elastically mounted on the stationary plate 3 and a torsion spring 37 which is in turn connected, at its end, to the other slide pin 4a of the movable plate 5. This actuating lever 36 is provided at an end thereof with a depression part 38 for receiving an actuating rod 39 of the switch 8 while the other end thereof is selectively caught by the first restriction mechanism so as to be selectively restricted in its rotation thereby.

In the first restriction mechanism, a first restriction lever 42, integrally comprising a locking slot 40 and a locking protuberance 41, is biased by a coiled torsion spring 43 supported by the stationary plate 3. This first restriction lever 42 is commonly hinged to the shaft of the mode changing lever 28 of the mode changing assembly.

The selection mechanism, which is hinged to the main plate 1 such that it turns at the same time of the rotation of the movable assembly and, as a result, carries out the selective power transmission, has a selection lever 44 which is commonly hinged to the shaft of the lower driven gear 16 under this gear 16. This selection lever 44 also has a longitudinal hole 45 which is formed on an end of the lever 44 and in turn receives the upward protuberance 33 of the movable lever 31. At the other end of the selection lever 44, a movable gear 46 engaging with the lower driven gear 16 and rotating therewith is rotatably mounted to the selection lever 44. With such a construction, the movable gear 46 selectively engages, in accordance with the rotation of the selection lever 44, with the third power transmission gear 20 which in turn engages with the first intermediate gear 19. Otherwise, this gear 46 engages with the second intermediate gear 19a which in turn engages with the second reel gear 18a.

The biasing mechanism, causing the cam gear 21 of the cam assembly to initially engage with the power transmission assembly, comprises a biasing lever 48 which is commonly hinged to the shaft of the second power transmission gear 17 and biased by a coiled torsion spring 60. One end of this biasing lever 48 elastically cooperates, owing to biasing force of the torsion spring 60, with the lower cam 26 which is formed on the lower surface of the cam gear 21, while the other end thereof cooperates with the second restriction mechanism which will be described in detail below. This biasing lever 48 tends to move in accordance with the rotation of the cam gear 21 and, as a result causes the second restriction mechanism to move.

The second restriction mechanism, which controls the rotation of the selection mechanism within the predetermined range, comprises a second restriction lever 70 which is commonly hinged to the shaft of the third power transmission gear 20 and biased by the aforementioned coiled spring 60. This second restriction lever 70 tends to turn about its shaft at the same time of the rotation of the biasing lever 48, thereby causing its one end to be caught by a locking slot 44a formed on an end of the selection lever 44 of the selection assembly.

In FIGS. 2 to 6b, the reference numerals 47, 47a and 47b denote first to third intervals formed on the circumferential periphery, on which the rack 22 is also formed, of the cam gear 21, respectively, and 47 and 47a to 47h denote first to ninth inclination surfaces of the protuberances 23 on the outer cam 24 of the cam gear 21.

FIG. 7 shows an interconnection between the mode changing lever 28, the actuating lever 36 and the first restriction lever 40. FIG. 8 shows an interconnection between the movable lever 31 and the selection lever 44. FIG. 9 shows an interconnection between the second restriction lever 70 and the selection lever 44.

The operational effect of the preferred embodiment of the present invention will be described as follows.

In the preferred embodiment of the present invention, the mode changing is carried out among five modes: the stop mode, the play mode, the record mode, the reverse play mode and the reverse record mode. Mode changing is performed under the control of a control mechanism (not shown) in response to mode selection of the user.

For convenience in describing the preferred embodiment, assume the position of the deck mechanism in the stop mode to be the reference position of the mechanism. With this reference position, assume a position wherein the mode changing lever 28 is in the stop position, otherwise stated, wherein the lever 28 comes into contact with the inner surface of the outer cam 24, to be $A_1$, assume a position wherein the lever 28 is in the neutral position to be $A_2$ and assume a position wherein the lever 28 comes into contact with the outer surface of the outer cam 24 to be $A_3$. Similarly, assume a position wherein the movable lever 31 is in the stop position, otherwise stated, wherein the lever 31 is in the neutral position, to be $B_1$, assume a position wherein the lever 31 is in a clockwise rotated position to be $B_2$ and assume a position wherein the lever 31 is in a counterclockwise rotated position to be $B_3$.

Similarly, assume a position wherein the actuating lever 36 is in the stop position, otherwise stated, wherein the lever 36 is in the neutral position, to be $C_1$, assume a position wherein the lever 36 is in a clockwise rotated position to be $C_2$ and assume a position wherein the lever 36 is in a counterclockwise rotated position to be $C_3$.

In addition, assume a position wherein the first restriction lever 42 is in the stop position to be $D_1$ and assume a position wherein the lever 42 is in a clockwise rotated position to be $D_2$.

Furthermore, assume a position wherein the selection lever 44 is in the stop position, otherwise stated, wherein the lever 44 is in the neutral position, to be $E_1$, assume a position wherein the lever 44 is in a counterclockwise rotated position to be $E_2$ and assume a position wherein the lever 44 is in a clockwise rotated position to be $E_3$.

Hereinbelow, the mode changing operations of the preferred embodiment of this invention will be described under the condition that all of the mode changing operations start from the stop mode shown in FIG. 2.

In the stop mode shown in FIG. 2, the guide protuberance 30 on the lower end of the mode changing lever 28 is caught by the first locking shoulder 27 of the outer cam 24 of the cam gear 21, while the second power transmission gear 17 comes into contact with the first interval 47 of the circumferential periphery of the cam gear 21.

In addition, the biasing lever 48, which is commonly hinged to the shaft of the second power transmission gear 17 and biased by the coiled torsion spring 60, is caught at its one end by the lower cam 26 of the cam gear 21, causing the cam gear 21 to be biased in order to rotate clockwise. Hereinafter, the clockwise rotations of the rotational members are referred to the normal rotations.

Note that the positions of the other members except for the aforementioned members and functional relations therebetween in this stop mode will be in detail described below in the description of the mode changing operation.

Upon selection of the play mode in order to make the mode of the deck mechanism be changed from the stop mode into the play mode, outside electric power is applied to the drive motor 6 which thus rotates in the normal direction. At the same time, the electric operated solenoid 7 is applied with the outside electric power.

In this case, the normal rotation of the motor 5 generates the driving power which is in turn transmitted to the pair of capstans 9 and 9a, the auxiliary pulley 10 and the main pulley 12 by means of the belt 13. Also, drive shafts (not shown), each of which is fixed to the shaft of each of the capstans 9 and 9a under the stationary plate 3, rotate together with the rotation of the capstans 9 and 9a. The rotation of the main pulley 12 also causes the main gear 11, integrally formed therewith, to rotate.

The rotational power caused by the rotation of the main gear 11 is then transmitted to the upper driven gear 15 by way of the first power transmission gear 14. The upper driven gear 15 thus rotates and permits the lower driven gear 16, which is integrally concentrically formed with the upper driven gear 15, to rotate about its rotating shaft.

The rotation of the upper driven gear 15 permits the second power transmission gear 17 engaging therewith to rotate.

When the driving power of the drive motor 6 is applied to the intermediate assembly and the power transmission assembly as described above, the solenoid 7 applied with the electric power biases the mode changing lever 28 which has been in the position $A_1$ so as to cause this mode changing lever 28 to turn clockwise about its turning shaft. This turning operation of the lever 28 makes the guide protuberance 30 provided on the lower end thereof escape from the first locking shoulder 27 of the outer cam 24 of the cam gear 21 and permits the mode changing lever 28 to turn in order to move to the position $A_2$.

On the other hand, since the protuberance 30 of the mode changing lever 28 escapes from the first locking shoulder 27 of the cam gear 21, this cam gear 21 accomplishes its turnable position. In addition, the biasing lever 48 turns clockwise about its turning shaft owing to its own biasing force generated by the coiled spring 60 and, as a result, the one end thereof pushes the lower cam 26 of the cam gear 21 so as to make the cam gear 21 rotate in the normal direction. The normal rotation of the cam gear 21 in a predetermined rotational angle permits the rack 22 formed on the circumferential periphery of the cam gear 21 to engage with the second power transmission gear 17 which has come into contact with the first interval 47 of the cam gear 21.

The driving power outputted from the drive motor 6 is transmitted to the cam gear 21 and this makes this gear 21 rotate in the normal direction. At this time, since the drive motor 6 continues its rotation, the guide protuberance 30 of the mode changing lever 28 is caused to move inwards under guidance of the first inclination surface 49 of the outer cam 24. The mode changing lever 28, therefore, returns to its initial position, otherwise stated, this lever 28 shifts its position from $A_2$ to $A_1$.

At this time, the inner cam 25 of the cam gear 21 rotates along with the rotation of the cam gear 21 so that the downward protuberance 34 of the extension rib 35 integrally formed with the movable lever 31 moves simultaneously with being guided by the inner cam 25. The movable lever 31 thus turns clockwise and, as a result, shifts its position from the neutral position B to the position $B_2$. Also, the pin 4 of the movable plate 5 which is inserted in the longitudinal hole 32 of the movable lever 32 moves along with the movement of the movable lever 31 and this makes the movable plate 5 move rightwards.

Such a rightward movement of the movable plate 5 necessarily causes the other pin 4a thereof to move in the same direction at the same time. Hence, the other pin 4a pushes the torsion spring 37 rightwards. The pins 4 and 4a of the movable plate 5 are also inserted in the longitudinal holes 2 and 2a of the stationary plate 3 as described above so that they move within predetermined ranges defined by the lengths of the holes 2 and 2a, respectively.

When the torsion spring 37 provided at the one end of the actuating lever 36 is compressed, this spring 37 tends to bias the lever 36 which is maintained at the position C in order to make it turn clockwise about its turning shaft. However, this actuating lever 36 is also caught at the other end thereof by the locking slot 40 of the first restriction lever 42. In this respect, this lever 36 does not turn but elastically maintains its neutral position, that is, the position $C_1$.

At this position, the continuous rotation of the drive motor 6 causes the cam gear 21 to continuously rotate clockwise until the second power transmission gear 17 comes into contact with the second interval 47a between the racks 22 of the cam gear 21. In this case, the protuberance 30 of the mode changing lever 28 is caught by the second locking shoulder 27a of the outer cam 24 of the cam gear 21, thereby causing the cam gear 21 to stop rotating. When this cam gear 21 stops its rotation as described above, the required mode changing operation for the play mode is accomplished.

As a result, the second power transmission gear 17 does not transmit the driving power of the drive motor 6 to the cam gear 21, but runs idle.

When the movable lever 31 turns clockwise as described above in order to shift its position from $B_1$ to $B_2$, the other end of the movable lever 31 turns counterclockwise centering around the turning shaft of the lever 31. Since the upward protuberance 33 formed on the other end of the movable lever 31 is inserted in the longitudinal hole 45 formed on the other end of the selection lever 44, the one end of the selection lever 44 turns counterclockwise centering around the turning shaft of the selection lever 44 at the same time of the counterclockwise turning of the other end of the movable lever 31.

Therefore, the selection lever 44 shifts its position from the position $E_1$ to the position $E_2$ and, at this position, the movable gear 46 provided on the other end of the selection lever 44 and engaging with the lower driven gear 16 engages with the third power transmission gear 20. Hence, this movable gear 46 engages with both the lower driven gear 16 and the third transmission gear 20.

The rotational power of the main gear 11, which rotates upon reception of the driving power of the drive motor 6 applied thereto through the power transmission assembly, is transmitted to the first power transmission gear 14, the upper driven gear 15, the lower driven gear 16, the movable gear 46, the third power transmission gear 20 and the first intermediate gear 19 in order. As aforementioned, because the first intermediate gear 19 engages with the first reel gear 18, the rotational power of the main gear 11 transmitted to the intermediate gear 19 causes the first reel gear 18 to rotate in the normal direction. This normal rotation of this first reel gear 18 drives the right-side reel of the tape cassette and this permits the tape to be fed out of the tape cassette and a head drum (not shown) to play back the audio and video signals recorded on the tape.

This play mode state of the deck mechanism is shown in FIG. 3 and the moving passage of the protuberance 30 of the mode changing lever 28 with respect to the outer cam 24 of the cam gear 21 is schematically shown at the arrow of FIG. 10b. As depicted in FIG. 10b, the protuberance 30 moves from the initial position, or the stop mode position wherein it is caught by the first locking shoulder 27 of the outer cam 24 as shown in FIG. 10a to the play mode position wherein it is caught by the second locking shoulder 27a of the outer cam 24.

Meanwhile, when the movable lever 31 turns clockwise in order to shift its position from the position $B_1$ to the position $B_2$, the movable plate 5 moves rightwards. The rightward movement of this plate 5 makes a conventional right-side pinch roller (not shown) come into contact with one of the aforementioned drive shafts which is fixed to the rotational shaft of the capstan 9 under this member 9. At this state, the right-side pinch roller along with the drive shaft rotates at the same time of operational start of the head drum, thereby causing the audio and video signals recorded on the tape to be played back.

On the other hand, when the record mode is selected in order to change the mode, or the stop mode, of the deck mechanism into the record mode, the drive motor 6 starts its rotational operation and generates the driving power which tends to be in turn transmitted to the driven members by way of the power transmission assembly. At the same time, the mode changing lever 28 which has maintained in the stop mode position $A_1$ turns about its turning shaft so as to shift its position from $A_1$ to $A_2$ by means of the electrically operated solenoid 7 which is applied with outside electric power in a moment when the record mode is selected. As a result, one of the racks 22 of the cam gear 21 engages with the second power transmission gear 17, which is applied with the driving power of the motor 6, causing the cam gear 21 to rotate in the normal direction. In the same manner as described in the aforementioned mode changing for the play mode, the mode changing lever 28, when the record mode is selected, is guided by the outer cam 24 of the cam gear 21 in order to shift its position from $A_1$ to $A_2$ and in turn returns to its initial position $A_1$, At this state, the electrically operated solenoid 7 is again applied with the outside electric power in a moment and this causes the mode changing lever 28 to turn about its turning shaft in order to shift its position from $A_1$ to $A_2$ as depicted in FIG. 4a. After the position of the mode changing lever 28 is shifted as described above, the lever 28 is initially guided by the second inclination surface of the outer cam 24 of the cam gear 21 in accordance with the continued rotation of the cam gear 21.

In order to achieve this state, the mode changing lever 28 has turned in order to be positioned at $A_2$ and the movable lever 31 has turned in order to be positioned at $B_2$, while the actuating lever 36 maintains its initial position $C_1$. In addition, the first restriction lever 42 maintains its initial position $D_1$ and biased by the torsion spring 37.

When the cam gear 21 continuously rotates at the above-mentioned position, the protuberance 30 of the mode changing lever 28 which has been positioned at $A_2$ moves clockwise centering around its turning shaft under guidance of the second inclination surface 49a of the outer cam 24 of the cam gear 21. As a result, the position of the mode changing lever 28 is shifted from the position $A_2$ to the position $A_3$ and the pushing part 29 integrally formed with the lever 28 pushes the first restriction lever 42 downwards. In this respect, this first restriction lever 42 moves from the position D to the position $D_2$ as it is biased by the spring 43 simultaneously with releasing the other end of the actuating lever 36 from its locking state wherein the other end of the lever 36 is caught by the locking slot 40 of the first restriction lever 42. Hence, the actuating lever 36, which has been biased by the torsion spring 37 in order to tend to turn clockwise, turns clockwise about its turning shaft and shifts its position from C to $C_2$.

When the actuating lever 36 turns toward the position $C_2$, the clockwise turning of the lever 36 causes the actuating rod 39 of the switch 8, which is inserted in the depression part 38 formed on the one end of the actuating lever 36, to move rightwards. Thus, the stop mode of the deck mechanism is changed into a mode wherein the recording of the outside sound and image on the tape is possible. At this state, since the cam gear 21 continuously rotates and, in this respect, the protuberance 30 of the mode changing lever 28 passes along the second inclination surface 49a of the outer cam 24 and guided by the third inclination surface 49b of this cam 24 in order to be in turn caught by the second locking shoulder 27a of the cam 24. When the protuberance 30 is caught by the shoulder 27a, the mode changing lever 28, which has shifted its position from $A_3$ to $A_2$, reaches the position $A_1$. As a result, the deck mechanism completes the mode changing operation for changing the stop mode shown in FIG. 2 into the record mode shown in FIG. 4b.

Figure 10C:
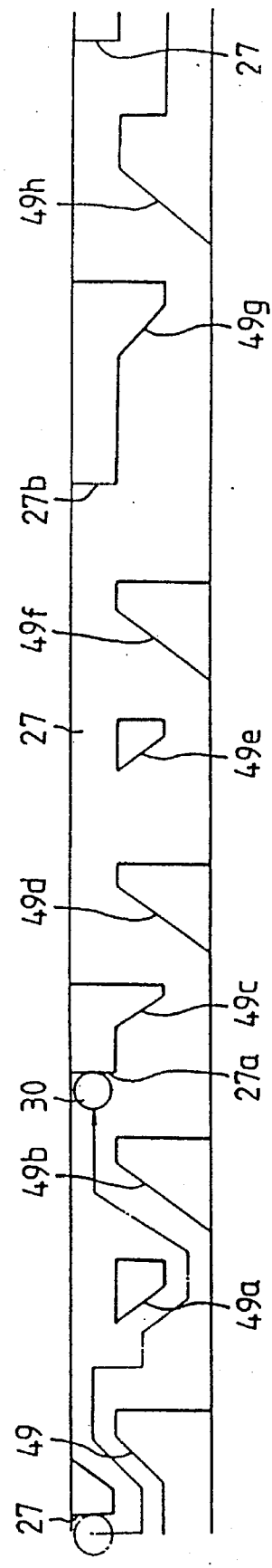

In this mode changing operation for the record mode, the moving passage of the protuberance 30 of the mode changing lever 28 with respect to the outer cam 24 is schematically shown in FIG. 10c.

In this case, the downward biasing force of the pushing part 29 of the mode changing lever 28 is removed from the first restriction lever 42 at the same time of the positional shift, $A_3 \rightarrow A_2$, of the mode changing lever 28 so that the first restriction lever 42 which has been positioned at the position $D_2$ returns to its initial position D against the restoring force of the spring 43.

Also, the actuating lever 36 is already positioned at the position $C_2$ as described above and, in this respect, the other end of this lever 36 is caught by the locking protuberance 41 of the first restriction lever 42.

In this record mode, the power transmission of the driving power of the drive motor 6 and rotational power of the main gear 11 are carried out in the same manner as described above in the mode changing operation for the play mode. As a result, the first reel gear 18 rotates in the normal direction and drives the right-side reel of the tape cassette and, as a result, causes the tape to be fed out of the tape cassette, thereby permitting the outside sound and image to be recorded on the running tape.

Hereinbelow, the mode changing operation of the deck mechanism when the reverse play mode is selected will be described.

The mode changing for achieving the reverse play mode may be started from the stop mode shown in FIG. 2, the play mode shown in FIG. 3 or the record mode shown in FIG. 4b. If this mode changing operation is started from the stop mode, the parts of the deck mechanism operate in the same manner as described above in the play mode selection so as to complete the mode changing operation for changing the stop mode into the play mode before carrying out of the mode changing operation for changing the play mode into the reverse play mode. Thus, note that the operation of the deck mechanism for changing the stop mode into the play mode is omitted from the following description and can be efficiently referred to the above description.

In order to change the play mode shown in FIG. 3 into the reverse play mode shown in FIG. 5c, the electrically operated solenoid 7 is first applied with outside electric power in a moment under the condition that the protuberance 30 of the mode changing lever 28 is caught by the second locking shoulder 27a of the outer cam 24 of the cam gear 21. In this respect, the mode changing lever 28 turns clockwise about its turning shaft in order to shaft its position from $A_1$ to $A_2$ and, at this state, the biasing lever 48 slightly pushes the lower cam 26 formed on the lower surface of the cam bear 21. As a result, one of the racks 22 of the cam gear 21 engages with the second power transmission gear 17 which is applied with the driving power of the drive motor 6 so that this driving power is transmitted to the cam gear 21 and makes this cam gear 21 rotate in the normal direction.

During this normal rotation of the cam gear 21, the protuberance 30 of the mode changing lever 28 is guided by the outer cam 24 for a predetermined time and, thereafter, slides along the fourth inclination surface 49c of the outer cam 24 in order to shift its position from $A_2$ to $A_3$. At the same time, the pushing part 29 integrally formed with the mode changing lever 28 pushes the first restriction lever 42 downwards, thereby causing this first restriction lever 42 to shift from the position $D_1$ to the position $D_2$ against the biasing force of the spring 43.

When the mode changing lever 28 turns about its shaft by the moving fourth inclination surface 49c of the outer cam 24 as depicted in FIG. 5a and, in this respect, shifts its position from $A_2$ to $A_3$, the first restriction lever 42 moves from $D_1$ to $D_2$. At this position, the other end of the actuating lever 36 which has been caught by the locking slot 40 of the first restriction lever 42 escapes from the slot 40, thereby causing this actuating lever 36 to turn about its turning shaft in order to shift its position to $C_2$. This turning operation of the actuating lever 36 also makes the actuating rod 39 of the switch 8, which is inserted in the depression part 38 formed on the one end of the lever 36, move rightwards.

At this position, the rotation of the cam gear 21 causes the protuberance 30 of the mode changing lever 28 to move under the guidance of the fifth inclination surface 49d of the outer cam 24 as well as movement of the downward protuberance 34 of the extension rib 35 of the movable lever 31 under the condition it is guided by the inner cam 25 of the cam gear 21. Thus, this movable lever 31 starts to move from the position $B_2$ to the position $B_1$ and the mode changing lever 28 starts to move from the position A3 to the position $A_2$.

When the movable lever 31 reaches its position $B_1$, the movable plate 5 of which the pin 4 is inserted in the longitudinal hole 32 of the movable lever 31 reaches its neutral position. At the same time, the movement of the movable plate 5 causes the other pin 4a to move toward its neutral position simultaneously with pushing the torsion spring 37 leftwards. Thus, the torsion spring 37 applies its biasing force to the actuating lever 36 and causes this lever 36 to move toward the position $C_1$.

In accordance, the actuating rod 39 of the switch 8 which is inserted in the depression part 38 of the one end of the actuating lever 36 moves leftwards in order to be positioned at the neutral position. This position is shown in FIG. 5b.

When the movable lever 31 completes the position shift from $B_2$ to $B_1$, the selection lever 16 of which the longitudinal hole 45 receives the upward protuberance 33 formed on the other end of the movable lever 31 has turned about its turning shaft in order to return to its initial position $E_1$. Thus, the movable gear 46 which is provided on the other end of the selection lever 44 is separated from the third power transmission gear 20 so that the driving power of the drive motor 6 is not transmitted to the first reel gear 18.

Meanwhile, when the mode changing lever 28 is positioned at $A_2$ and the biasing force which has applied to the first restriction lever 42 is released, this first restriction lever 42 turns counterclockwise in order to return to its initial position $D_1$ due to the restoring force of the spring 43. As a result, the locking slot 40 of the restriction lever 42 receives the other end of the actuating lever 36. Thereafter, the rotating cam gear 21 causes the protuberance 30 of the mode changing lever 2a to move under the condition that it is guided by the fifth inclination surface 49d of the outer cam 24 so as to be positioned at the position $A_1$. Thereafter, this protuberance 30 continuously moves under guidance of the inner surface of the outer cam 24 until it is caught by the third locking shoulder 47b of the outer cam 24.

On the other hand, while the protuberance 30 of the mode changing lever 28 is guided by the inner surface of the outer cam 24 as described above, the downward protuberance 34 of the extension rib 35 of the movable lever 31 is guided by the inner cam 25 of the cam gear 21 until the position of the movable lever 31 is shifted from $B_1$ to $B_3$.

In addition, the movement of the movable lever 31 for causing the position of this lever 31 to be shifted to $B_3$ pushes leftwards the pin 4 of the movable plate 5 which is inserted in the longitudinal hole 32 of the one end of the movable lever 31. Here, the pin 4 is also inserted in the longitudinal hole 2 of the stationary plate 3 and, in this respect, this pin 4 moves to the left-side end of the hole 2 of the plate 3. Hence, this movable plate 5 completes its leftward movement from its neutral position, When the pin 4 of the movable plate 5 moves leftwards as described above, the other pin 4a of the plate 5 moves leftwards simultaneously with leftward pushing the torsion spring 37. Thus, this spring 37 generates biasing force which is in turn applied to the actuating lever 36. Upon reception of the biasing force of the torsion spring 37, the actuating lever 36 tends to turn about its shaft so as to cause its position to be shifted from $D_1$ to $D_3$. However, this lever 36 is caught at the other end thereof by the locking slot 40 of the first restriction lever 42 as aforementioned so that the lever 36 can not move but elastically maintains its position.

Figure 10D:
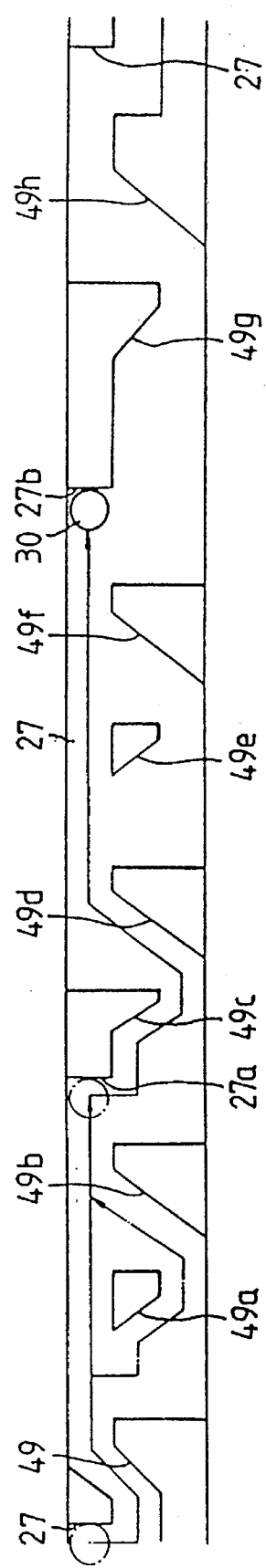

Thereafter, the protuberance 30 of the mode changing lever 28 is caught by the third locking shoulder 27b of the outer cam 24 and this makes the cam gear 21 stop its rotation. At this position, the second power transmission gear 17 is positioned at the third interval 47b formed on the periphery of the cam gear 21 between the racks 22 so that the driving power of the drive motor 6 can not be transmitted to the cam gear 21 and this causes the cam gear 21 to stop rotating. As a result, the mode changing operation for changing the mode of the deck mechanism into the reverse play mode is accomplished. The deck mechanism in this reverse play mode is shown in FIG. 5c, while the moving passage of the protuberance 30 of the mode changing lever 28 with respect to the outer cam 24 during the mode changing for the reverse play mode is schematically shown in FIG. 10d.

When the deck mechanism completes the mode change for the reverse play mode, the position of the movable lever 31 has shifted from $B_2$ to $B_3$ and the position of the selection lever 44 has shifted from E to $E_3$. Hence, the movable gear 46, provided on the other end of the selection lever 44 and engaging with the lower driven gear 16, engages with the second intermediate gear 19a. Hence, this movable gear 46 engages with both the lower driven gear 16 and the second intermediate gear 19a.

The rotational power of the main gear 11 generated by the driving power of the drive motor 6 is transmitted to the first power transmission gear 14, the upper driven gear 15, the lower driven gear 16, the movable gear 46 and the second intermediate gear 19a in order. As aforementioned, because the second intermediate gear 19a engages with the second reel gear 18a, the rotational power of the main gear 11 transmitted to the second intermediate gear 19a causes the second reel gear 18a to rotate in the reversed direction. This reversed rotation of this second reel gear 18a drives the left-side reel of the tape cassette and this permits the tape to be fed out of the tape cassette in the reversed direction.

When the movable lever 31 turns counterclockwise and its position is shifted from $B_2$ to $B_3$, the movable plate 5 moves leftwards. At this position, a conventional left-side pinch roller (not shown) comes into contact with the other drive shaft which is fixed to the rotational shaft of the capstan 9a under this member 9a. Thus, the left-side pinch roller along with the drive shaft rotates at the same time of operational start of the head drum and this starts the reverse play mode of the tape recorder.

Meanwhile, the mode change for the reverse play mode may start at the record mode. In order to cause such a mode changing operation to be more efficiently understood, the positions of all of the levers in the record mode of the deck mechanism are first described in conjunction with FIG. 4b as follows.

Turning to FIG. 4b, it is noted that the mode changing lever 28 is positioned at the position $A_1$, the movable lever 31 is positioned at the position $B_2$, the actuating lever 36 is positioned at the position $C_2$, the first restriction lever 42 is positioned at the position D and the selection lever 44 is positioned at the position $E_2$.

When the electrically operated solenoid 7 is applied with the outside electric power in a moment under the aforementioned positional condition of the levers, the mode changing lever 28 turns clockwise about its turning shaft so as to cause its position to be shifted from $A_1$ to $A_2$ and this makes the cam gear 21 to slightly rotate in the normal direction. The second power transmission gear 17, therefore, engages with one of the racks 22 of the cam gear 21 so that the driving power of the drive motor 6 is transmitted to the cam gear 21 through the second power transmission gear 17 and, as a result, causes the cam gear 21 to rotate in the normal direction.

During the normal rotation of the cam gear 21, the protuberance 30 of the mode changing lever 28 is guided by the fourth inclination surface 49c of the outer cam 24 in order to shift its position from $A_2$ to $A_3$. At the same time, the pushing part 29 integrally formed with the mode changing lever 28 pushes the first restriction lever 42 downwards, thereby causing the position of the first restriction lever 42 to be shifted from the position $D_1$ to the position $D_2$ against the biasing force of the spring 43. This first restriction lever 42 releases the other end of the actuating lever 36 which has been positioned at the position $C_2$ and caught by the locking slot 41 of the lever 42.

Thereafter, the rotating cam gear 21 causes the protuberance 30 of the mode changing lever 28 to be guided by the fifth inclination surface 49d of the outer cam 24 and, as a result, makes the lever 28 move toward the position $B_1$ and the actuating lever 36 move toward the position $C_1$.

The mode changing lever 28 then shifts its position from $A_3$ to $A_2$ since its protuberance 30 moves under guidance of the fifth inclination surface 49d of the outer cam 24. As a result, the biasing force, which has been applied to the first restriction lever 42 while the mode changing lever 28 is positioned at the position of $A_3$, is released from the lever 42, thereby permitting this lever 42 to shift its position from $D_2$ to $D_1$. Such a movement of the first restriction lever 42 causes the other end of the actuating lever 36 to be caught by the locking slot 40 of the lever 42.

Thereafter, the movable parts of the deck mechanism move, in the same manner as described above in the mode changing wherein the stop mode or the play mode is changed into the reverse play mode, in order to accomplish the mode change for the reverse play mode. In this respect, the more detailed description of the operation of the deck mechanism for accomplishing the reverse play mode can be efficiently referred to the above description and will be omitted.

Hereinbelow, the mode changing operation for achieving the reverse record mode will be described.

Such a mode changing operation preferably starts at the position of stop mode, however, it may start at the position of play mode or record mode. These mode changing operations are carried out in the same manner as described in the mode change for reverse play mode until the protuberance 30 of the mode changing lever 28 fully escapes from the fifth inclination surface 49d of the outer cam 24 regardless of their initial mode at which these operations start. Thus, note that the description of the same operation of the deck mechanism during this mode change for the reverse record mode as that of the mode change for the reverse play mode will be omitted from the following description and can be efficiently referred to the above description.

With reference to FIG. 6a, the mode changing lever 28 during this mode changing operation for achieving the reverse record mode turns clockwise about its turning shaft in order to shift its position from A to $A_2$ in accordance with the operation of the solenoid 7 which is applied with the outside electric power in a moment. Thereafter, the normal rotation of the cam gear 21 causes the protuberance 30 of the mode changing lever 28 to move under the condition that it is guided by the sixth inclination surface 49e of the outer cam 24 and to shift its position to $A_3$. At the same time, the pushing part 29 integrally formed with the mode changing lever 28 pushes the first restriction lever 42 downwards, thereby causing the lever 42 to elastically turn clockwise about its shaft and the position of this lever 42 to be shifted from $D_1$ to $D_2$ against the biasing force of the spring 43. In accordance, this first restriction lever 42 releases the other end of the actuating lever 36 which has been caught by the locking slot 41 of the lever 42.

At this time, the downward protuberance 34 of the extension rib 35 integrally formed with the movable lever 31 also moves under the condition that it is guided by the inner cam 25 of the cam gear 21. Thus, this movable lever 31 turns counterclockwise and shifts its position to $B_3$ and this turning operation of the lever 31 causes the movable plate 5, which is movably connected to the lever 31 by means of the longitudinal hole 32 and the pin 4, to move leftwards. In this respect, the actuating lever 36 which is also movably connected to the other pin 4a of the movable plate 5 turns counterclockwise about its turning shaft and shifts its position to $C_3$.

This turning operation of the actuating lever also makes the actuating rod 39 of the switch 8, which is inserted in the depression part 38 of the one end of the lever 36, move leftwards from its neutral position. Thus, the switch 8 makes the tape recorder be in a position prepared for reverse recording.

At this position, the rotation of the cam gear 21 causes the protuberance 30 of the mode changing lever 28 to pass along the sixth inclination surface 49e, and thereafter, be guided by the seventh inclination surface 49f of the outer cam 24. At this time, the mode changing lever 28 turns counterclockwise in order to shift its position from $A_3$ to $A_2$ and this permits the first restriction lever 42 to turn in the same direction due to the restoring force of the spring 43 so as to return to its initial position $D_1$.

Thereafter, the mode changing lever 2a turns counterclockwise in order to leave the position $A_2$, to fully escape from the seventh inclination surface 49f of the outer cam 24 and in turn to be caught by the third locking shoulder 27b of the cam 24 as shown in FIG. 6b which shows the deck mechanism when it completes the mode changing operation for achieving the reverse record mode.

Figure 10E:
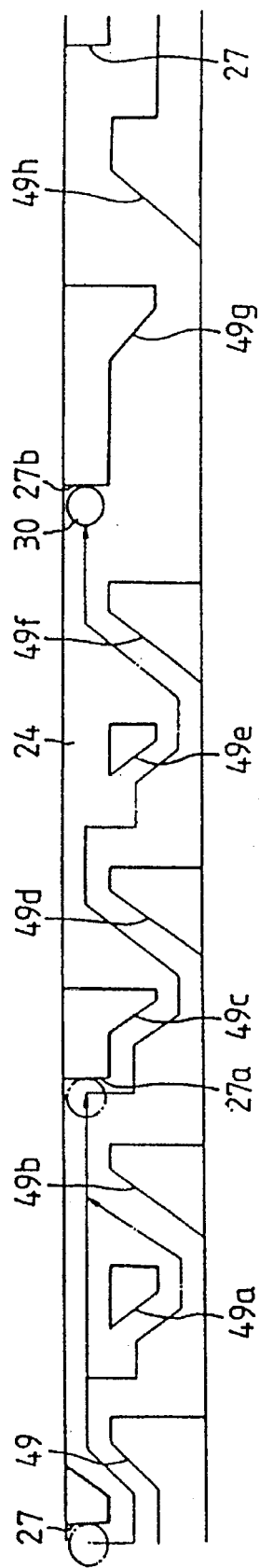

In this mode changing operation, the moving passage of the protuberance 30 of the mode changing lever 28 with respect to the outer cam 24 is schematically shown in FIG. 10e.

When the deck mechanism in the reverse record mode is compared to that in the reverse play mode, it is noted that the mode changing lever 28 shifts its position to $A_1$ differently from the reverse play mode, while the other levers are positioned at the same positions as those in the reverse play mode. In addition, the power transmission is carried out in the same manner as that of the reverse play mode. In this respect, the second reel gear 18a rotates in the reversed direction and, as a result, causes the left-side reel of the tape cassette to rotate in the reversed direction and the tape to be fed out of the cassette in the same direction.

The mode change wherein the reverse play mode or the reverse record mode is changed into the stop mode will be described last as follows.

In order to change the reverse play mode of the deck mechanism into the stop mode, the electrically operated solenoid 7 which is applied with the outer electric power in a moment at the same time of the mode selection causes the mode changing lever 28 to turn clockwise about its turning shaft so that this lever 28 shifts its position to $A_1$. As a result, the cam gear 21 slightly rotates and this causes the rack 22 of this gear 21 to engage with the second power transmission gear 17 which transmits the driving power of the drive motor 6 to the cam gear 21 which thus rotates in the normal direction.

When the cam gear 21 rotates in the normal direction in a predetermined number of rotations, the downward protuberance 34 of the extension rib 35 of the movable lever 31 moves under the condition it is guided by the inner cam 25 of the cam gear 21, thereby causing the movable lever 31 to shift its position from $B_3$ to $B_1$. As a result, the pin 4 of the movable plate 5 which is inserted in the longitudinal hole 32 of the movable lever 31 moves rightwards and, as a result, reaches its neutral position in the longitudinal hole 2 of the stationary plate 3 and this makes the movable plate 5 also move to its neutral position. Here, this movable plate 5 is also provided with the other pin 4a which moves to its neutral position together with the rightward movement of the movable plate 5. In this respect, the torsion spring 37 which has been biased leftwards so as to tend to bias the actuating lever 36 to turn counterclockwise loses its biasing force.

The rotation of the cam gear 21 causes the protuberance 30 of the mode changing lever 28 to be guided by the eighth inclination surface 49g of the outer cam 24 and this makes the lever 28 shift from the position $A_2$ to the position $A_3$. Hence, the pushing part 29 of the lever 28 pushes the first restriction lever 42 downwards, thereby causing the position of the first restriction lever 42 to be shifted from $D_1$ to $D_2$ against the biasing force of the spring 43.

Here, the protuberance 30 of the lever 28 is sequentially guided by the eighth and ninth inclination surfaces 49g and 49h of the outer cam 24 and, as a result, causes the mode changing lever 28 to move from the position $A_3$ to the position $A_2$.

As a result, the first restriction lever 29 which has been positioned at the position $D_2$ by means of the pushing part 29 returns to its initial position, or the position $D_1$, due to the restoring force of the spring 43 and this makes the locking slot 40 of the restriction lever 42 receive the other end of the actuating lever 36 which has been positioned at the position $C_1$.

At this position, the rotation of the cam gear 21 causes the protuberance 30 of the lever 28, which has been guided by the ninth inclination surface 49h, to be caught by the first locking shoulder 27 of the outer cam 24 as described in the stop mode. Thus, the mode changing lever 28 is positioned at the position $A_1$, the movable lever 31 is positioned at the position $B_1$, the first restriction lever 42 is positioned at the position $D_1$, the actuating lever 36 is positioned at the position $C_1$ and the selection lever 44 is positioned at the position $E_1$.

Meanwhile, when it is required to change the reverse record mode into the stop mode, the electric operated solenoid 7 is applied with the outside electric power in a moment and makes the mode changing lever 28 shift from the position A to the position $A_2$. Thereafter, this lever 2a is guided by the outer cam 24 of the rotating cam gear 21. In this case, since the protuberance 30 of the lever 2a is guided by the eighth inclination surface 49g of the outer cam 24, the lever shifts to the position $A_3$, the movable lever 31 shifts to the position B and the movable plate 5 moves to its neutral position.

Here, the movement of the movable lever 31 causes the actuating lever 36 to tend to shift its position from $C_3$ to $C_1$ due to the biasing force of the spring 37. However, the first restriction lever 42 is positioned at $D_1$ wherein its locking slot 40 catches the other end of the actuating lever 36 and, in this respect, the actuating lever 36 necessarily elastically maintains its position. Thereafter, when the pushing part 29 of the mode changing lever 28 pushes downwards the restriction lever 42 at the same time of clockwise turning of the lever 28 for shifting its position to $A_3$, the locking slot 40 of the lever 42 releases the other end of the actuating lever 36. This lever 36 thus turns counterclockwise due to the restoring force of the spring 37 and shifts its position from $C_3$ to $C_2$. This counterclockwise turning operation of the lever 36 in turn causes the actuating rod 39 of the switch 8 which is inserted in the depression part 38 of the lever 36 to return to its neutral position. As a result, the switching state of the tape recorder for carrying out the reverse recording ends.

The rotation of the cam gear 21, thereafter, causes the protuberance 30 to be guided by the ninth inclination surface and this makes the lever 28 shifts its position from $A_3$ to $A_2$. As a result, the biasing force which has been applied to the restriction lever 42 is removed and, as a result, this restriction lever 42 turns counterclockwise due to the restoring force of the spring 43. Thus, this lever 42 returns to its initial position, otherwise stated, the position of the lever 42 is changed from $D_2$ to $D_1$. The other end of the actuating lever 36 is thus inserted in the locking slot 40 of the lever 42.

Figure 10F:
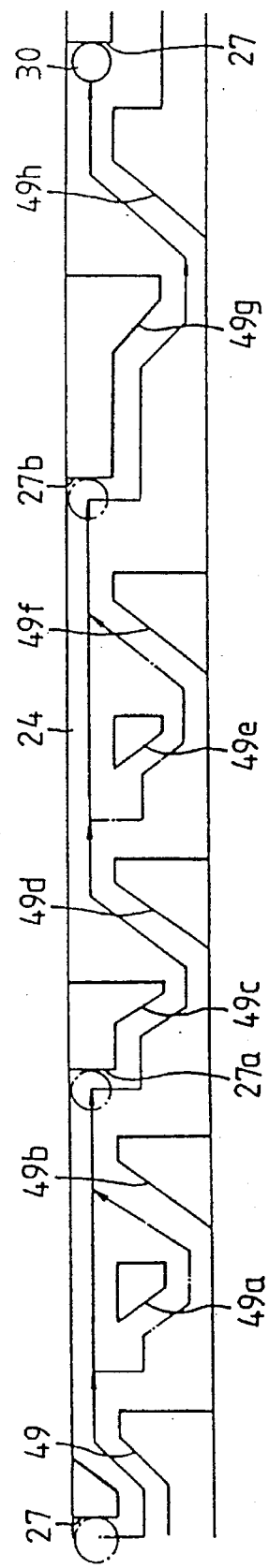

Thereafter, the parts of the deck mechanism actuate in order to accomplish the mode changing operation for achieving the stop mode in the same manner as described in the aforementioned mode changing operation wherein the reverse play mode is changed into the stop mode. In this respect, the actuation of the parts will be efficiently omitted and can be referred to the above description. Meanwhile, the moving passage of the protuberance 30 of the lever 28 during this mode changing operation for the reverse record mode is schematically shown in FIG. 10f.

As described above, the mode changing apparatus of the deck mechanism according to the preferred embodiment of the present invention includes only one cam gear and one electric operated solenoid for carrying out all of the mode changing operations and, in this respect, causes the number of required parts to be reduced and its construction to be simplified. As a result, the preferred embodiment of this invention can reduce the manufacturing cost of the deck mechanism and accomplish the recent trend of compactness and thinness of the deck mechanism.

Hereinbelow, the operational effect of the preferred embodiment for preventing the overrunning of the tape out of the tape cassette will be described.

In order to prevent the overrunning of the tape, it is only required to restrict the clockwise rotation of the selection lever 44 which is shown in detail in FIG. 9.

Conventionally, the selection lever 44 tends to always rotate clockwise since the drive motor 6 rotates clockwise when the play mode, the record mode, the reverse play mode or the reverse record mode is selected and this causes the upper and lower driven gears 15 and 16 to rotate clockwise.

As a result, when it is selected to change the stop mode into the play mode, the record mode, the reverse play mode or the reverse record mode, the selection lever 44 tends to rotate clockwise due to the clockwise rotations of the upper and lower driven gears 15 and 16 as described above. However, the second restriction lever 70 of the second restriction means is caught by the locking slot 44a formed on the one side of the selection lever 44 as depicted in FIGS. 3 to 6b and, in this respect, the selection lever 44 is prevented from its clockwise rotation until the stop mode shown in FIG. 2 is selected, Thus, the overrunning of the tape is efficiently prevented.

When the stop mode of the deck mechanism is achieved as shown in FIG. 2, the biasing lever 48 which has elastically turned clockwise by means of the lower cam 25 of the cam gear 21 turns counterclockwise in order to return to its initial position as shown in this drawing. As a result, the biasing force which has been applied to the second restriction lever 70 by the biasing lever 48 is removed and, as a result, this second restriction lever 70 turns clockwise in order to return to its initial position.

At this position, the movable gear 46 engages with neither the third power transmission gear 20 nor the second intermediate gear 19a.

As described above, the mode changing apparatus of the deck mechanism according to the preferred embodiment of the present invention controls the movement of a selection lever which in turn controls engagement of the gears and prevents the overrunning of the tape out of the tape cassette. Thus, the preferred embodiment of this invention overcomes the problem introduced by the prior art wherein the audio and video signals recorded on the overrun tape can not be played back.

Although the preferred embodiments of the present invention have been disclosed for illustrative purpose, those skilled in the art will appreciate that various modifications, additions and substitutions are possible, without departing from the scope and spirit of the invention as disclosed in the accompanying claims. For example, even though the preferred embodiment of the present invention has been described to be applied to cassette tape recorders, this invention may be applied to moving mechanisms of video tape recorders or deck moving mechanisms used for various types of audio/video systems using capstan motors.

What is claimed is:

1. A method for mode changing of a cassette tape recorder having a mode changing apparatus including mode changing means for changing a mode of the tape recorder into another mode in response to operating of a solenoid and a cam assembly for selectively rotating upon reception of driving power, the cam assembly having an outer cam which is provided with first to ninth inclination surfaces and first to third locking shoulders, the method comprising the steps of:

selectively controlling the mode changing means to move along the outer cam to engage selective ones of the inclination surfaces and be caught by selective ones of the locking shoulders, thereby achieving the mode changing for a stop mode, a play mode, a reverse play mode or a reverse record mode; the mode changing steps including:

a play mode changing step wherein the mode changing means is guided by the first inclination surface in order to be caught by the second locking shoulder, thereby causing the play mode to be achieved;

a record mode changing step wherein the mode changing means is sequentially guided by the first to third inclination surfaces in order to be caught by the second locking shoulder, thereby causing the record mode to be achieved;

a reverse play mode changing step wherein the mode changing means is sequentially guided by the fourth and fifth inclination surfaces in order to be caught by the third locking shoulder, thereby causing the reverse play mode to be achieved; and a reverse record mode changing step wherein the mode changing means is sequentially guided by the fourth to seventh inclination surfaces in order to be caught by the third locking shoulder, thereby causing the reverse record mode to be achieved.

2. A method for changing modes of a cassette tape recorder having a mode changing apparatus including a movable plate, a first reel gear for driving a reel of a tape cassette to carry out a play mode and a record mode, a second reel gear for driving a reel of a tape cassette to carry out a reverse play mode and a reverse record mode, selection means for selectively supplying drive power to the first and second reel gears, a movable member for controlling the selection means and for moving the movable plate, a mode changing member having a cam follower, a cam gear having a first cam cooperating with the cam follower of the mode changing member and a second cam cooperating with the movable member, a solenoid selectively engaging the mode changing member, and a switch responsive to the mode changing member and the movable plate for activating the record mode or the reverse record mode of the tape recorder, the method comprising the steps of:

selectively rotating the cam gear;

controlling rotation of the mode changing member with the first cam during rotation of the cam gear;

controlling rotation of the movable member with the second cam during rotation of the cam gear to selectively position the movable plate and to control the selection means to selectively supply drive power to the first and second reel gears;

selectively rotating the mode changing member with the solenoid to control the position of the cam follower relative to the first cam; and actuating the switch in response to movement of the movable plate and the rotation of the mode changing member.

3. The method of claim 2, further including the step of restricting rotation of the selection means to prevent tape from a tape cassette in the tape recorder from overrunning.

* * * * *